United States Patent
Colquhoun et al.

(10) Patent No.: US 9,828,478 B2
(45) Date of Patent: Nov. 28, 2017

(54) REVERSIBLE DERIVATIZATION OF POLY (ARYL ETHER KETONES)

(71) Applicant: CYTEC TECHNOLOGY CORP., Wilmington, DE (US)

(72) Inventors: Howard Matthew Colquhoun, Kuntsford (GB); Patrick Terence McGrail, North Yorkshire (GB); Francois Pierre Vincent Paoloni, Cambridge (GB); Philip Hodge, Nr Lancaster (GB); Ioannis Manolakis, Berkshire (GB); Paul Mark Cross, York (GB)

(73) Assignee: CYTEC TECHNOLOGY CORP., Wilmington, DE (US)

( * ) Notice: Subject to any disclaimer, the term of this patent is extended or adjusted under 35 U.S.C. 154(b) by 0 days.

(21) Appl. No.: 14/878,563

(22) Filed: Oct. 8, 2015

(65) Prior Publication Data

US 2016/0075840 A1    Mar. 17, 2016

Related U.S. Application Data

(62) Division of application No. 12/601,093, filed as application No. PCT/US2008/063822 on May 16, 2008, now abandoned.

(30) Foreign Application Priority Data

May 22, 2007    (GB) .................................. 0709815.5

(51) Int. Cl.
*C08J 5/24*     (2006.01)
*C08G 65/48*    (2006.01)
(Continued)

(52) U.S. Cl.
CPC ............... *C08J 5/24* (2013.01); *C08G 65/48* (2013.01); *C08L 71/10* (2013.01); *C08L 81/06* (2013.01); *C08J 2381/02* (2013.01)

(58) Field of Classification Search
CPC ....................................................... C08J 5/24
(Continued)

(56) References Cited

U.S. PATENT DOCUMENTS 3,734,888 A * 5/1973 Darms ....................... C08J 7/12
                                                    525/419
3,956,240 A * 5/1976 Dahl ....................... C08G 63/12
                                                    528/125
(Continued)

FOREIGN PATENT DOCUMENTS

JP            61063673 A  *  4/1986

*Primary Examiner* — Mike M Dollinger
(74) *Attorney, Agent, or Firm* — Thi Dang

(57) ABSTRACT

A method of forming a polymer matrix composite using a soluble derivative of a poly (aryl ether ketone) (PAEK). The method includes mixing a starting PAEK polymer with a solvent and an acid, said solvent being selected from a group consisting of diethylether, tetrahydrofuran (THF), dioxin, and chlorinated solvents; reacting the PAEK mixture with a Lewis acid and a thiol compound in amounts effective to form a poly (aryl ether thioacetal) compound which comprises at least one thioacetal group; and impregnating a plurality of fibers in a solution comprising said poly (aryl ether thioacetal) compound.

11 Claims, 15 Drawing Sheets

(51) Int. Cl.
*C08L 71/10* (2006.01)
*C08L 81/06* (2006.01)

(58) Field of Classification Search
USPC .......................................................... 525/471
See application file for complete search history.

(56) References Cited

U.S. PATENT DOCUMENTS

| | | | | |
|---|---|---|---|---|
| 4,616,056 A | * | 10/1986 | Chan | C08G 61/127 524/170 |
| 4,882,397 A | * | 11/1989 | Kelsey | C08G 65/4006 525/471 |
| 4,957,801 A | * | 9/1990 | Maranci | B29C 70/086 428/147 |
| 5,093,460 A | * | 3/1992 | Kelsey | C07C 43/315 528/125 |
| 5,143,986 A | * | 9/1992 | Reuter | C08G 65/4012 525/132 |
| 5,889,024 A | * | 3/1999 | Miller | C07D 401/14 514/316 |
| 5,910,558 A | * | 6/1999 | Schoenherr | C08J 3/122 523/223 |
| 7,237,679 B1 | * | 7/2007 | Hendrickson | B01J 2/04 209/638 |
| 2002/0176979 A1 | * | 11/2002 | Evans | B29C 70/465 428/292.1 |
| 2007/0003772 A1 | * | 1/2007 | Tacken | C23C 18/1889 428/457 |
| 2009/0208806 A1 | * | 8/2009 | Izuhara | C08G 65/4056 429/450 |
| 2011/0040045 A1 | * | 2/2011 | Colquhoun | C08G 65/48 525/471 |

\* cited by examiner

REVERSIBLE DERIVATIZATION OF POLY (ARYL ETHER KETONES)

This application is a Divisional Application of U.S. application Ser. No. 12/601,093 filed Aug. 2, 2010, which is a national stage entry of the International Application No. PCT/US2008/063822 filed May 16, 2008, which claims the benefit of prior GB Application No. 0709815.5 filed May 22, 2007, which is incorporated herein by reference in its entirety.

BACKGROUND OF THE INVENTION

Field of the Invention

The invention relates generally to solubilizing polymers and, in particular, to reversible derivatization of poly (aryl ether ketones) (PAEKs) to enhance their solubility.

Description of the Related Art

Over the past 20 years, a new class of high performance materials, poly (aryl ether ketones), or PAEKs, have emerged and gained commercial importance. PAEKs having a wide range of ether/ketone ratios have been developed in order to tailor the properties of the resulting materials. Examples of commercially important PAEKs include poly (ether ketone) (PEK), poly (ether ether ketone) (PEEK), poly (ether ketone ketone) (PEKK) and poly (ether ketone ether ketone ketone) (PEKEKK). These materials are thermoplastics which possess high glass transition temperatures, greater than about 140° C., good stability to oxidation, and low dielectric constants. They also substantially retain these mechanical properties at elevated temperatures.

PAEKs have been employed for the fabrication of medical instruments which are in direct contact with the body, such as endoscopes, cannula, and cardiac pump systems. These semi-crystalline materials show significant solvent resistance and chemical stability over a wide range of temperatures and are commonly used as injection loop stators and fittings in chromatography systems such as high performance liquid chromatography (HPLC) and gel permeation chromatography (GPC), also known as high-pressure size exclusion chromatography. PAEKs are further resistant to many chemicals widely used in the aerospace industry, including dichloromethane ($CH_2Cl_2$), lubricating oils, hydraulic fluids, and gasoline, and are thus used in housing to protect electric wires and fiber optic filaments in aircraft production. The low flammability and low smoke emissions of PAEKs also makes them excellent candidates for commercial aircraft interiors. Furthermore, polymer composites based on PAEKs have excellent mechanical characteristics and can be very light. For example, Aromatic Polymer Composite-2 (APC-2, Cytec, Inc.) is a composite possessing a PEEK matrix with reinforcing carbon fiber that is now used extensively in the construction of both commercial and military aircraft.

While the resistance of PAEKs to chemicals is often a benefit in their commercial utility, this property also limits the ability to characterize PAEKs. For example, a high performance liquid chromatography (HPLC) technique such as gel permeation chromatography (GPC), separates components based on their molecular size in solution to determine the molecular weight distribution of a polymer. A PAEK such as PEEK, however, can absorb organic solvents such as dichloromethane, o-dichlorobenzene, or N,N-dimethylformamide (DMF), giving rise to solvent-induced crystallization and plasticization. Furthermore, common organic solvents have little or no effect on semi-crystalline PEEK, even at elevated temperatures. Thus, little information is known about the mass distribution of these materials because of the difficulty in finding a PAEK solvent compatible with GPC.

The commercial importance of PEEK and other PAEKs has thus attracted significant attention to the problem of PAEK solubility and a variety of methods have been developed for characterizing and solubilizing PAEKs. In one approach, PAEKs have been characterized by the inherent viscosity of the dilute polymer solution in concentrated sulfuric acid. Unfortunately, this technique does not provide a measure of the polydispersity index, a measure of the distribution of molecular weights in the polymer. In another approach, it has been found that a mixture of phenol and 1,2,4-trichlorobenzene can be used as an eluent for PEEK GPC analysis at about 115° C. However, these solvents are highly toxic and, therefore, unsuitable for routine characterization of PEEK or other PAEKs.

In another example, PEEK may be sulfonated according to the reaction:

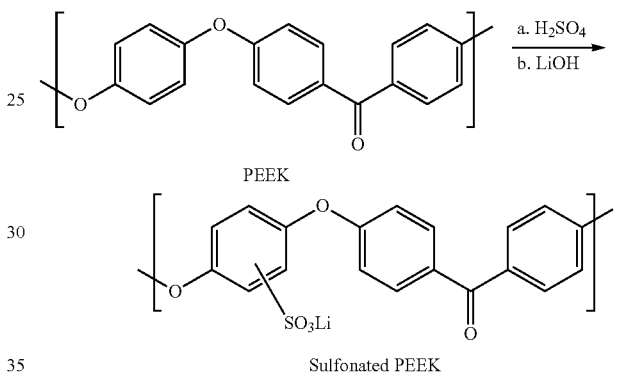

The sulfonated PEEK has been found to be soluble in dipolar aprotic solvents such as DMF and N-Methylpyrrolidone (NMP).

In a further example, the addition of nitric acid to a solution of PEEK in methanesulfonic acid (MSA) leads to the formation of nitro-derivatives of PEEK.

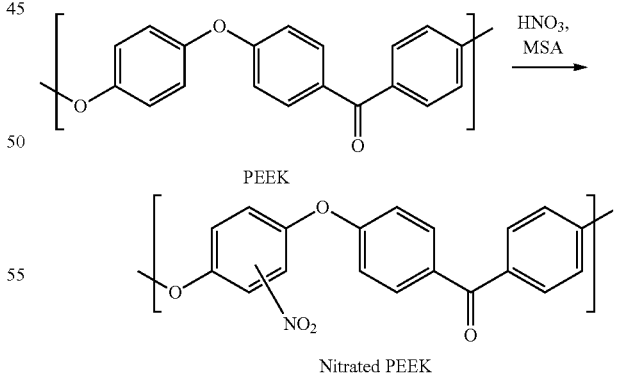

A significant deficiency with the routes illustrated above, however, is that each route works with different efficiency. That is to say, relatively few PAEKs are capable of sulfonation, even under harsh conditions. For example, sulfonation works on PAEKs such as PEEK but not on polymers such as PEK. Thus, a general route which works efficiently for all PAEKs is not known.

Another drawback of these routes is that the polymer chains often experience irreversible chemical changes or degradation, yielding a final polymer with different properties from the starting polymer. For example, in the formation of nitro-derivatives of PEEK, it is believed that the polymer chains are degraded because of the strong decrease observed in the solution viscosity of the nitrated PEEK. Thus, this derivative is not suitable for GPC analysis.

One method to produce soluble PAEKs is the polymerization of monomers that will impart solubility to the polymer. This would involve selecting a monomer that has, eg bulky side groups to disrupt the crystallinity of the polymer formed, and polymerizing this to make a soluble PAEK. This method is useful for preparing soluble PAEKs but does not allow the use of standard commercial PAEKs. This method also necessitates a selected monomer and polymerisation for each soluble PAEK that is desired. This method is therefore not general in the sense that standard commercial PAEKs cannot be made soluble after they have been polymerized but must be made soluble at the time of polymerization.

From the foregoing, there is a need for improved methods of solubilizing PAEK systems. In particular, there is a need for a method of solubilizing PAEKs which is broadly applicable to PAEKs and is substantially reversible.

SUMMARY OF THE INVENTION

Embodiments of the present disclosure provide methods of forming a soluble derivative of a poly (aryl ether ketone)) ("PAEK". The method comprises dissolution of the PAEK in a mixture comprising a solvent and an acid and intermixing a Lewis acid, such as, boron trifluoride-diethyl etherate and a thiol compound with the PAEK mixture in sufficient quantity so as to form a poly (aryl ether thioacetal) corresponding to the PAEK in solution and then, if desired, further reaction with solvent, N-bromosuccinimide (NBS) and an alcohol to form a substantially soluble poly (aryl ether acetal).

Other embodiments of the present disclosure provide methods of forming a PAEK from a derivatized poly (aryl ether thioacetal) or poly (aryl ether acetal). The method (in the case of the thioacetal) comprises obtaining a poly (aryl ether thioacetal) derived from a selected PAEK and reacting the poly (aryl ether thioacetal) with a mixture of t-butyl iodide and dimethyl sulfoxide. The resulting PAEK possesses an inherent viscosity approximately equal to that of a virgin PAEK. The PAEK (in the case of the acetal) can be recovered by application of heat or steam (either with or without acid).

Further embodiments of the present disclosure provide methods of analyzing PAEKs by gel permeation chromatography (GPC). The method comprises solubilizing a PAEK, where solubilizing modifies the PAEK to form a poly (aryl ether thioacetal). The method also comprises dissolving the poly (aryl ether thioacetal) in a solvent suitable for GPC. The method additionally comprises probing the poly (aryl ether thioacetal) by GPC.

Additional embodiments of the present disclosure provide methods of forming polymer matrix composites. The method comprises prepregging a plurality of fibers in a solution, where the solution comprises a poly (aryl ether thioacetal) or a poly (aryl ether acetal). The method further comprises consolidating the fibers by application of at least one of heat and pressure.

Further embodiments of the present disclosure provide polymer matrix composites formed by the above method.

Other embodiments of the present disclosure provide thioacetalized or acetalized derivatives of PAEKs. The PAEKs are selected from the group consisting of PEK, PEEK, PEKK, PEKEKK, PEEKEEK, PEDK, PEDEK, PEDEKK, PEKEN, a polymer comprising a recurring unit having at least one of the structures of Formula (I):

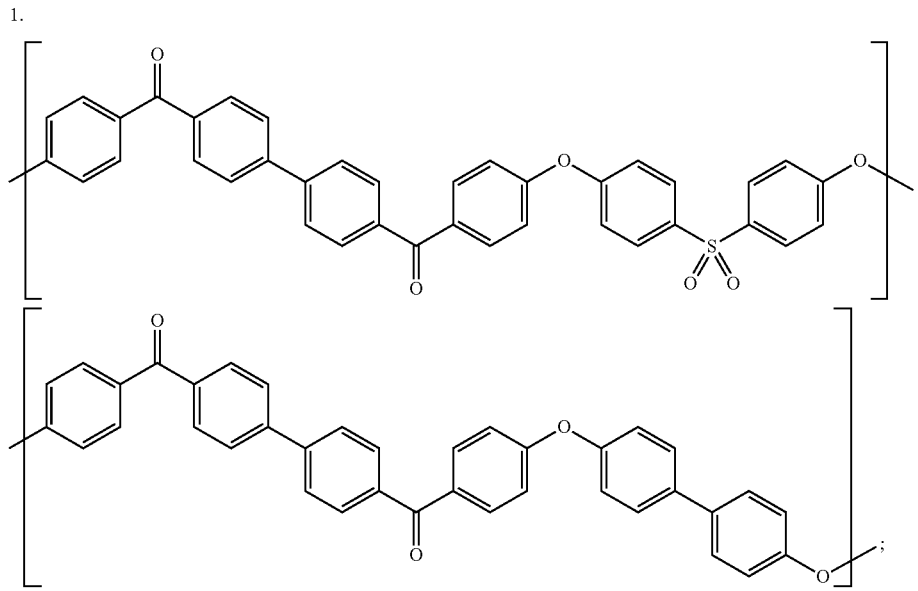

Formula (I)

and a polymer comprising a recurring unit having at least one of the structures of Formula (II):

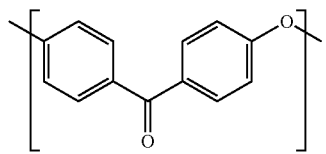
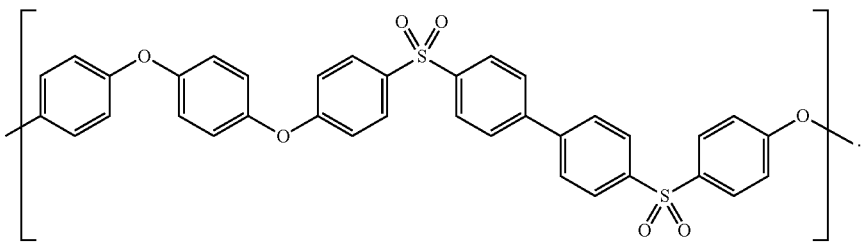

Formula (II)

DETAILED DESCRIPTION OF THE PREFERRED EMBODIMENT

Figure 1:
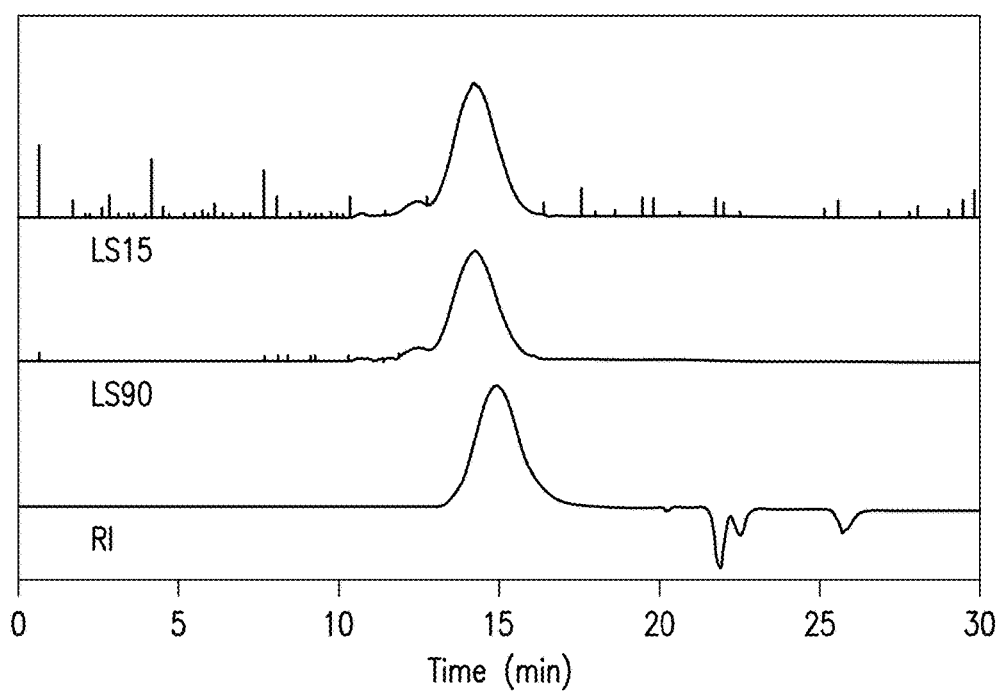
FIG. 1 illustrates GPC traces analyzing the thioacetal formed from protection of PEEK Avecia with 1,2-ethanedithiol.

Embodiments of the present disclosure present systems and methods for the reversible derivatization of poly (aryl ether ketones), also known as poly (aromatic ether ketones), or PAEKs. PAEK is a generic name for the class of aromatic polymers containing both ketone and ether links between benzene rings. In general, solubilizing the PAEK involves initial reaction of the PAEK with a thiol compound in a reversible thioacetalization process. The thiol reacts with the ketone group present in the PAEKs to yield a thioacetal compound which is substantially soluble in common solvents. The modified thioacetal is then either subjected to a second, deprotection reaction for conversion back to the original PAEK, or is reacted further to an acetal species, and then deprotected back to the original PAEK.

Solubilizing PAEKs is beneficial in a number of aspects. In one aspect, solubilizing PAEKs facilitates the use of analytical techniques, such as gel permeation chromatography (GPC), to characterize the PAEKs. In another aspect, solubilization opens up additional routes to chemical modification of PAEKs. For example thio-modified PAEKs may be further modified to form diacetals and mono acetal-mono thiols, or quaternized to form the corresponding salts. In a further aspect, solubilization provides increased flexibility in the processing of PAEKs, allowing processing from solution, rather than the melt, as has traditionally been done.

Advantageously, the reversible thioacetalization and acetalization route disclosed below provide significant advantages over presently understood routes for solubilizing PAEKs. In one aspect, thioacetalization provides modified PAEKs in high yield, facilitating use of these methods in large scale operations. In another aspect, the modified PAEKs are substantially soluble in common solvents, reducing the need for expensive and/or highly toxic/corrosive solvents. Furthermore, the modified PAEKs can be converted back to the starting polymer with substantially no degradation. In addition, thioacetalization and subsequent acetalization is expected to be applicable to substantially all PAEKs, providing a general method for solubilization of PAEKs. These and other objects and advantages of the present disclosure are discussed in greater detail below.

The reversible solubilization of PAEKs involves a two step reaction process, schematically illustrated below in Reactions (1), (2), (3) and (4).

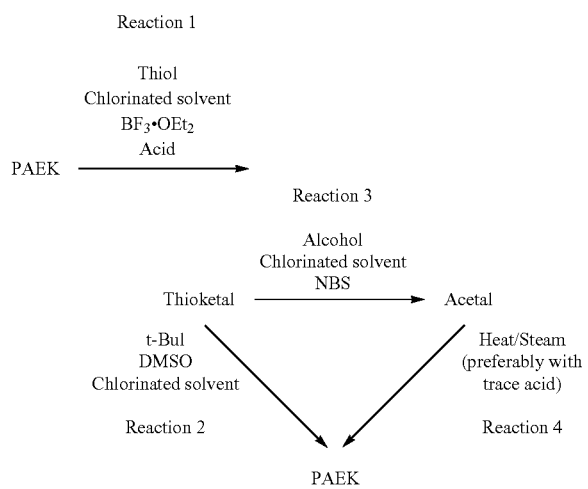

In Reaction (1), a PAEK is reacted with a thiol compound. This reaction protects the carbonyl groups of the PAEK with the thiol, forming a poly (aryl ether thioacetal) which is a substantially soluble derivative of the PAEK. As described in greater detail below, the poly (aryl ether thioacetal) is produced in high yields and is substantially soluble in common organic solvents. This solubility is aided by disruption of the crystallinity of the PAEK. For example, PEEK may react to form poly (ether ether thioacetal), or PEET. Other dithioacetal derivatives of several other PAEKs have been formed using thiols and are found to be similarly soluble in organic solvents, enabling their characterization by GPC.

Reaction (1) is performed in the following manner. The PAEK is first dissolved in a mixture of a suitable solvent and an acid. Next, boron trifluoride-diethyl etherate and excess thiol are intermixed with the PAEK mixture. These materials are used in excess to promote complete reaction. The reaction is subsequently allowed to proceed for a selected time period to ensure substantially complete conversion of the PAEK to the poly (aryl ether thioacetal). In one embodiment, the time period may vary between approximately 16 hours and four days. The poly (aryl ether thioacetal) is then removed from the solution by precipitation. In one embodiment, precipitation is conducted in cold methanol. Characterization, modification (Reaction (3) and Reaction (4)), and other processing of the modified PAEK may then performed, as necessary, before conversion back to the starting PAEK.

The poly (aryl ether thioacetal) is converted back to the starting PAEK through a deprotection reaction, Reaction (2). The deprotection reaction removes the thioacetal group and restores a carbonyl group in its place, recovering the PAEK. The deprotection reaction comprises dissolving the thioacetal in a suitable solvent, followed by intermixing t-butyl iodide and dimethylsulfoxide (DMSO) into the thioacetal solution at, in the case of the DMSO solvent, approximately 70° C. A solvent may be used to assist the thioacetal in staying in solution, for at least a portion of the early duration of the reaction. Examples of the solvent include, but are not limited to, diethylether, tetrahydrofuran (THF), dioxin, and chlorinated solvents such as dichloromethane (DCM), trichloromethane (chloroform), dichloroethane, and dichlorobenzene. The mixture is refluxed for a selected time, in one embodiment, about 48 hours, and subsequently cooled to about room temperature. The PAEK is subsequently recovered from solution by precipitation, such as through intermixture with cold methanol. In one advantage, the mild and substantially neutral conditions provided by this mixture present a low likelihood of degrading the PAEK.

The current method of deprotection using chemical means is limited in applicability although further methods of deprotection are possible that may be more commercially viable. The PAEKs may also be recycled from composites such as those described above. This may be accomplished, for example, by treating the composite materials with a solvent and reagents as set forth in Reaction (1) above to obtain a thioacetal derivative of the PAEK in solution. The solution can then be separated from the fibrous materials of the recycled composites and used in further prepregging processes. Alternatively, the thioacetal solution could be further treated as set forth in Reaction (2) or in Reaction (3).

Additional chemical modification of the poly (aryl ether thioacetal) is also possible and allows alternative protecting groups to either fully or partially replace the thioacetal groups on the polymers. These groups can be chosen to allow alternative methods of deprotection back to the initial PAEK. An example of this additional chemical modification is the replacement of the thioacetal protecting group with an acetal group (Reaction (3), which allows different deprotection methods to be used to convert the protected polymer back to the original PAEK Reaction (3) is performed in the following manner. The poly (aryl ether thioacetal) is dissolved in dichloromethane to form a pink/light purple solution. Ethylene glycol is then added dropwise to the solution and immediately afterwards, fine NBS is added very slowly, over around 10-15 minutes. The solution, which progressively turns a dark purple on addition of NBS is then stirred for an additional 5-7 minutes. The additional stirring time is determined by a color change of the solution from purple to an orange/green/brown color. The solution is then precipitated into stirred methanol and stirred for 20 minutes. After this time the material is filtered and then washed with additional methanol, stirred for 20 minutes and then filtered and dried.

Reaction 4 can be performed by a variety of methods, some of which remain unoptimized. Methods shown to fully deprotect the acetal protected polymer back to PAEK involve the use of microwave heating of the acetal protected polymer in water, optionally with acid present, to 160° C. for 15 min. This microwave heating is designed to emulate high pressure steam in production environments. Temperatures lower than 160° C. have been shown to effect significant deprotection although conditions have not been optimized for complete deprotection.

Substantially any PAEK may be used in conjunction with the reaction scheme discussed above. Embodiments of the PAEKs may include, but are not limited to, poly (ether ketone) (PEK), poly (ether ether ketone) (PEEK), poly (ether ketone ketone) (PEKK), poly (ether ether ketone ketone) (PEEKK), and poly (ether ketone ether ketone) (PEKEKK), poly (ether ether ketone ether ketone) (PEEKEEK), poly (ether diphenyl ketone) (PEDK), poly (ether diphenyl ether ketone) (PEDEK), poly (ether diphenyl ether ketone ketone) (PEDEKK), poly (ether ketone ether naphthalene) (PEKEN), a polymer comprising a recurring unit having at least one of the structures of Formula (I):

Formula (I)

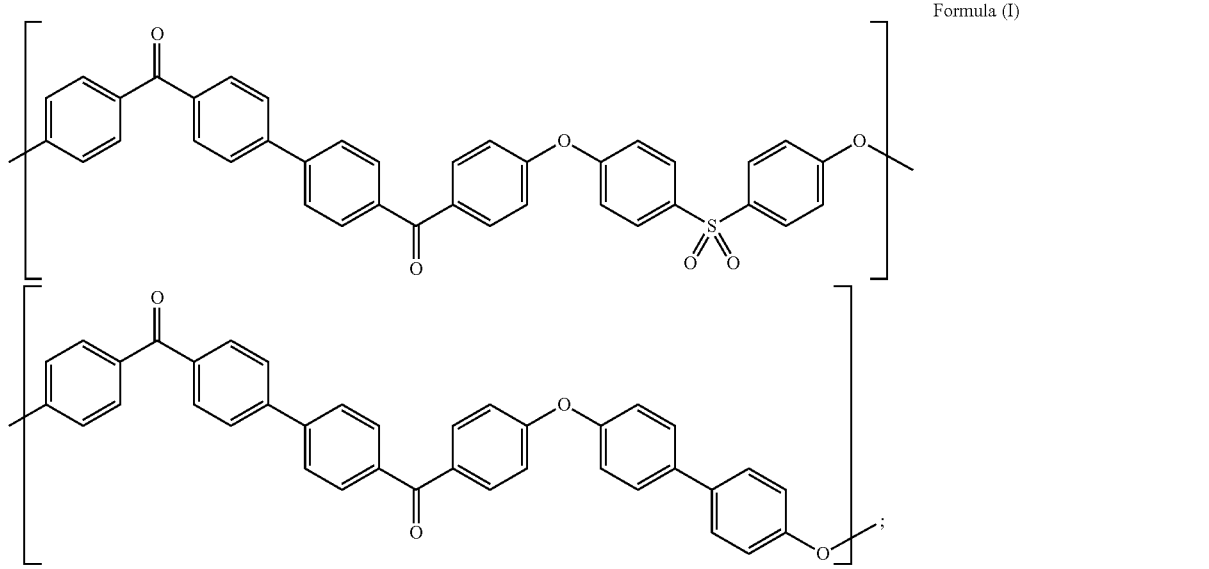

and a polymer comprising a recurring unit having at least one of the structures of Formula (II):

Formula (II)

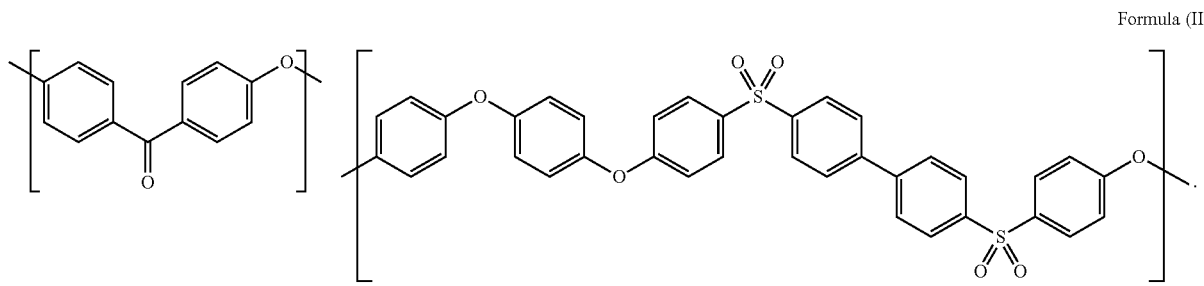

It may be understood, however, that these PAEKs are recited for example purposes and should in no way limit the PAEKs which may be utilized in embodiments of the invention. The PAEKs may be formed by known chemical synthesis routes or purchased commercially.

In one embodiment, a variety of thiol compounds may be used with embodiments of the present disclosure. For example, the thiol compounds may comprise monothiols of the form R—SH, dithiols of the form HSRSH, and thio-alcohols of the form HSROH, wherein R is selected from at least one of an optionally substituted $C_1$-$C_{30}$ aliphatic group and an optionally substituted $C_6$-$C_{30}$ aromatic group. The aromatic groups may directly link to the alcohol or thiol groups, as well as linking with other aromatic groups in the compound. Preferred thiol embodiments comprise 1,2 ethanedithiol and 1,3-propanedithiol. Additional reactions are also possible to replace either some or all of the thioacetal protecting groups (An example being Reaction (3)). These reactions may be employed to introduce a different protecting group into the polymer that may be removed by different means or different conditions than the dithioacetals. The thioacetal group could be exchanged for many different types of protecting groups common to ketone protection chemistry.

In a further embodiment, the acid may comprise any known non-sulfonating acid. In a preferred embodiment, the acid comprises trifluoroacetic acid. In another embodiment, the acid may comprise sulfuric acid when the PAEK comprises PEEK.

A wide variety of solvents may be employed in Reactions (1) and (2) and (3). In one embodiment, the solvents may comprise diethylether, tetrahydrofuran (THF), dioxin, and chlorinated solvents as are known in the art, such as dichloromethane (DCM), trichloromethane (chloroform), dichloroethane, and dichlorobenzene. The solvent may be selected based on cost, efficacy, availability, and level of toxicity.

Although the invention has been particularly described using boron trifluorise-diethyl etherate as the Lewis acid, other Lewis acids or mixtures of Lewis acids may be used.

Examples of the thioacetalization, deprotection, thioacetal to acetal exchange and subsequent reaction are discussed in greater detail below in the examples.

Solubilization of PAEKs may be employed to benefit manufacturing processes which utilize PAEKs. In general, PAEKs such as PEEK, PEK, and PEKEKK are important engineering thermoplastics for applications requiring extreme durability under severe operating conditions. These polymers possess oxidative and hydrolytic stability as well as melting points in the range of about 340-380° C., yielding very good thermo-mechanical stability in addition to resistance to solvent attack. Thus, PAEKs are routinely used as matrix materials in polymer matrix composites.

In certain embodiments, solubilizing the PAEKs may improve their utility in prepregging techniques for the fabrication of composite materials. Prepregs, in one embodiment, comprise thin sheets or lamina of unidirectional or woven fibers which are impregnated with matrix materials prior to formation of the composite body. The matrix typically comprises a thermosetting polymer. The prepregs may be stacked and subsequently treated with heat and pressure to consolidate the laminae, remove trapped air, and cure the polymer matrix. In other embodiments, individual fibers may be impregnated with matrix materials, such as solutions or solvent swollen gels of solubilized PAEKs, before being formed into desired shapes, for example by being wrapped around molds and thermoformed.

Soluble PAEKs may be used in processes previously unachievable with substantially non-soluble PAEKs. Examples of such processes include solution dipping, solution spray, filming and fiber impregnation. In solution dipping, the matrix material is dissolved in a solvent in a selected concentration and the fibers are passed through the solution, where they pick up an amount of matrix solids. In solution spray processes, the solubilized matrix material is sprayed onto the fiber. In filming processes the solvent swollen polymer is pressed into the fibers. In fabric impregnation processes, a fiber cloth is submerged in a bath of the dissolved matrix. Vacuum pressure, in one embodiment, may be used to pull air out of the fiber cloth and pull the matrix solution into the fiber cloth. Advantageously, the relatively low viscosity of the PAEK solution/solvent swollen PAEK may enter the void spaces between fibers in unidirectional and woven cloths, displacing entrapped air even before consolidation, reducing the void content of the final composite and potentially improving the composite properties over other processing routes.

The invention is now illustrated in non-limiting manner with reference to the following Examples.

EXAMPLES

The examples below present embodiments of the thioacetalization reaction of Reaction (1) for formation of soluble thioacetal derivatives of PAEKs comprising poly (aryl ether thioacetals). These examples illustrate the utility of thioacetalization reaction with a range of PAEKs and thiols. In particular, experimental characterization of the thioacetal derivatives through NMR illustrates that the ketone group is absent and the thioacetal is formed. Additional examples also illustrate embodiments of the deprotection reaction of Reaction (2) which convert the soluble thioacetal derivatives of PAEKs back to the original PAEKs without substantial degradation of the PAEK. In particular, GPC characterization illustrates that the deprotected materials are substantially the same as the original PAEKs. Examples also follow to show one of the many potential modifications that can be carried out on the thioacetal derivative of PAEK, namely the interchange reaction between thioacetal and acetal (Reaction (3)) and the deprotection of this acetal derivative back to PAEK.

Instrumentation

The melting points, glass transition, and melting transition temperatures of the polymers are determined by differential scanning calorimetry (DSC). A Mettler Toledo DSC20 system is employed under nitrogen at a scanning rate of 10 or 20° C.

The infrared spectra of the polymers are obtained from dispersion of the polymers in potassium bromide and are recorded on a Perkin Elmer FT1700 instrument.

The proton NMR ($^1$H NMR) spectra of the polymers are recorded on a Bruker DPX 250 spectrometer, a JEOL GSX 400 or a JEOL Eclipse+ 500 at 250 MHz, 400 MHz and 500 MHz respectively. The Carbon NMR ($^{13}$C NMR) was ran on a Brucker DPX 250, a JEOL Lambda 300 or a JEOL Eclipse+500 at 62.8 MHz, 75.57 MHz and 125.8 MHz respectively. Resonance positions are recorded in δ (ppm) from the tetramethylsilane (TMS) peak.

The solution viscosities ($\eta_{inh}$) of the polymers are measured using a Schott-Gerate CT 150 semi-automated viscometer at 25° C. The polymers are dissolved in approximately 98% sulfuric acid and vigorously stirred overnight to ensure substantially complete sulfonation. The polymer solutions are filtered before measurement to substantially remove any insoluble particles.

Gel permeation chromatography was carried out using either a Polymer Labs PL-GPC220 (Amherst, Mass.) or a Viscotek GPc Max. The analysis on protected PAEK's was performed in chloroform at about 35° C. with two PLgel 10 μm Mixed-B columns having dimensions of approximately 300 mm×7.5 mm. The analysis on standard PAEK's was performed by dissolving the samples (20 mg) in 4chlorophenol (1 ml), then diluting with 4 ml of the mobile phase, consisting of a 1:1 mix of 1,2,4-trichlorobenzene and phenol at 130° C. with ViscoGEL GMHhr-M-GMHhr-N columns.

Refractive index measurements are also performed on the polymers using a refractive index detector integrated within the GPC system. The refractive index detector was calibrated by a series of polystyrene standards.

The absolute molecular weights of the protected polymers was calculated using a PD2000DLS instrument from Precision Detectors, operating at about 15° and 90°. The value of the refractive index increment, do/dc, for each polymer sample is calculated by calibrating the detector with a sample of monodispersed poly (methyl methacrylate) (PMMA) having $M_p$ of approximately 100,000 and $M_w/M_n$ of approximately 1.04 and from the concentration trace obtained with the refractive index detector.

Microwave heating used in the deprotection of acetal protected samples was carried out on a CEM Mars 5 Microwave digestion apparatus.

Thermal deprotection and DSC analysis of the acetal species was carried out by heating using a Mettler-Toledo DSC 822e. DSC analysis on deprotected samples and unmodified PEEK was carried out by heating the sample to 420° C. to remove the thermal history, cooling at 20° C./min, then reheating at 20° C./min to 400° C.

TGA analysis was carried out on a Netzsch TG201 F1, in both Air and Nitrogen environments. Specimens weighing approximately 3.5 mg were prepared from each of the samples submitted. Specimens were heated from ~25° C. to 100° C. at a rate 10° C./minute, then from 100° C. to 520° C. in SuperRes mode

Example 1

PEEK and 1,2 Ethanedithiol (EDT)

In Example 1, thioacetalization of PEEK is performed using 1,2 ethanedithiol (EDT) according to Reaction (3):

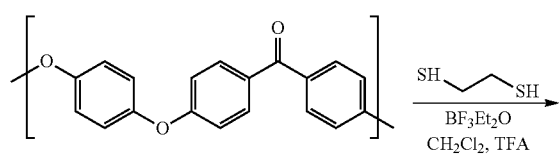

Reaction 3

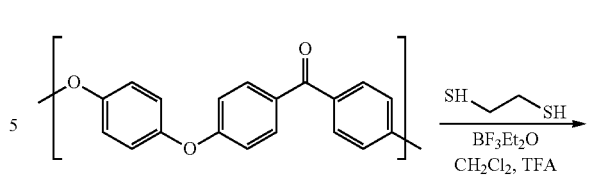

Reaction 4

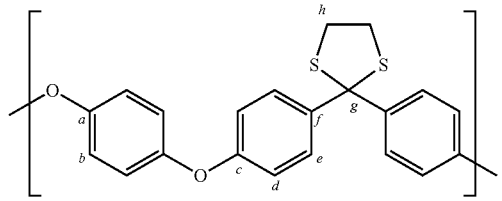

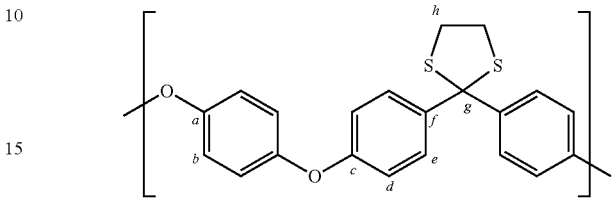

Under a nitrogen atmosphere, approximately 0.752 g (approximately 7.99 mmole) of EDT is added to a stirred solution of approximately 1.153 g of PEEK (from Avecia plc) in approximately 20 mL dichloromethane (CH$_2$Cl$_2$) and about 5 mL trifluoroacetic acid (TFA). The EDT addition is followed by addition of approximately 0.571 g (about 4.02 mmole) boron trifluoride diethyl etherate (BF$_3$Et$_2$O). The solution is stirred for about 18 hours, during which time the solution develops a deep red color. The solution is then diluted with about 50 mL of CH$_2$Cl$_2$ and subsequently poured into about 100 mL cold methanol. The resulting solution is filtered to recover a fine white powder of poly (ether ether dithioacetal). Approximately 1.456 g of poly (ether ether dithioacetal) is recovered, for a yield of approximately 100%.

GPC characterization of the poly (ether ether dithioacetal) yields the traces illustrated in FIG. 1. Table 1 below summarizes the measured values of $M_n$, $M_w$ and PDI for both refractive index and light scattering measurements.

The GPC characterization of the poly (ether ether dithioacetal) yields the following results:

$v_{max}$/cm$^{-1}$ 3039 (C—H), 2926 (C—H), 1603 (C—C), 1490 (C—C), 1224 (C—O—C), 1192 (C—H); $\delta_H$ (250 MHz, CDCl$_3$) 3.40 (4H, s, H$_h$), 6.88 (4H, AA'XX', H$_d$), 6.99 (4H, s, H$_b$), 7.53 (4H, AA'XX', H$_e$); $\delta$C (62.5 MHz, CDCl$_3$) 40.6 (C$_h$), 76.5 (C$_g$), 117.6 (C$_d$), 121.2 (C$_b$) 130.2 (C$_f$), 139.3 (C$_e$), 152.8 (C$_c$), 157.4 (C$_a$).

TABLE 1

GPC characterization of poly (ether ether dithioacetal) from PEEK and EDT

|  | RI | LS |
|---|---|---|
| $M_n$ | 193,900 | 63,400 |
| $M_w$ | 55,400 | 193,900 |
| PDI | 2.07 | 3.06 |

These data demonstrate that the carbonyl groups of the starting material have been removed and that the thioacetal, poly (ether ether dithioacetal), has been formed.

Example 2

PEEK and 1,2 Ethanedithiol (EDT)

In Example 2, thioacetalization of PEEK is performed using 1,2 ethanedithiol (EDT) according to Reaction (4):

Under a nitrogen atmosphere, approximately 0.393 g (approximately 4.17 mmole) of EDT is added to a stirred solution of approximately 0.576 g of PEEK (150G, from Victrex plc) in approximately 20 mL dichloromethane (CH$_2$Cl$_2$) and about 2 mL trifluoroacetic acid (TFA). The EDT addition is followed by addition of approximately 0.280 g (about 1.97 mmole) boron trifluoride diethyl etherate (BF$_3$Et$_2$O). The solution is stirred for about 3 days, during which time the solution develops a deep red color. The solution is then poured into about 100 mL cold methanol. The resulting solution is filtered to recover white fibers of poly (ether ether dithioacetal). Approximately 0.718 g of poly (ether ether dithioacetal) is recovered, for a yield of approximately 98%.

Figure 2:
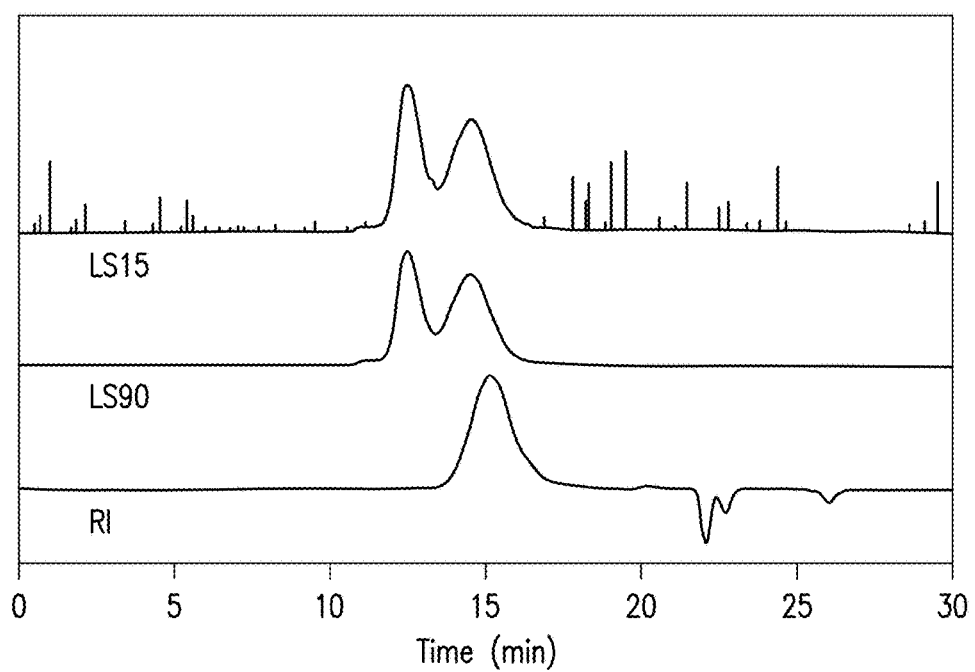
FIG. 2 illustrates GPC traces analyzing the thioacetal formed from protection of PEEK 150G with 1,2-ethanedithiol.

GPC characterization of the poly (ether ether dithioacetal) yields the traces illustrated in FIG. 2. Table 2 below summarizes the measured values of $M_n$, $M_w$ and PDI for both refractive index and light scattering measurements.

The GPC characterization of the poly (ether ether dithioacetal) yields the following results:

$v_{max}$/cm$^{-1}$ 2929 (C—H), 1603 (C—C), 1492 (C—C), 1225 (C—O—C), 1193 (C—H); $\delta_H$ (250 MHz, CDCl$_3$) 3.40 (4H, s, H$_h$), 6.92 (4H, AA'XX', H$_d$), 7.03 (4H, s, H$_b$), 7.50 (4H, AA'XX', H$_e$); $\delta$C (62.5 MHz, CDCl$_3$) 40.6 (C$_h$), 76.5 (C$_g$), 117.6 (C$_d$), 121.2 (C$_b$) 130.2 (C$_f$), 139.3 (C$_e$), 152.8 (C$_c$), 157.4 (C$_a$).

TABLE 2

GPC characterization of poly (ether ether dithioacetal) from PEEK 150G and EDT

|  | RI | LS |
|---|---|---|
| Mn | 18,500 | 89,600 |
| Mw | 52,500 | 244,500 |
| PDI | 2.84 | 2.73 |

These data demonstrate that the carbonyl groups of the starting material have been removed and that the thioacetal, poly (ether ether dithioacetal), has been formed.

Example 3

PEEK and 1,2 Ethanedithiol (EDT)

In Example 3, thioacetalization of PEEK 450G (from Victrex plc) is performed using 1,2 ethanedithiol (EDT) according to Reaction (5):

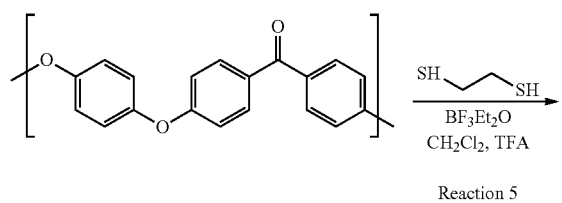

Reaction 5

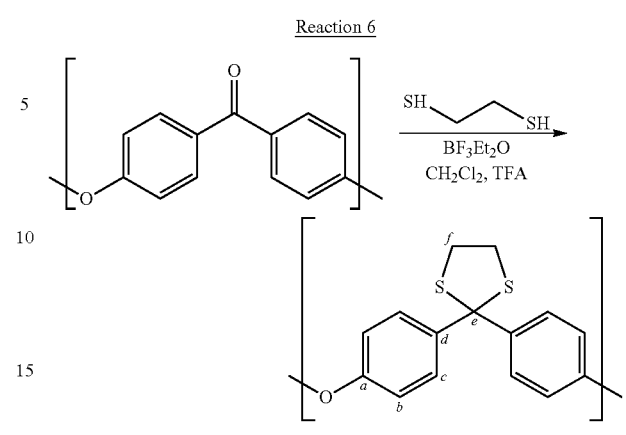

Reaction 6

Under a nitrogen atmosphere, approximately 0.393 g (approximately 4.17 mmole) of EDT is added to a stirred solution of approximately 0.576 g of PEEK 450G in approximately 20 mL dichloromethane ($CH_2Cl_2$) and about 2 mL trifluoroacetic acid (TFA). The EDT addition is followed by addition of approximately 0.280 g (about 1.97 mmole) boron trifluoride diethyl etherate ($BF_3Et_2O$). The solution is stirred for about 3 days, during which time the solution develops a deep red color. The solution is then poured into about 100 mL cold methanol. The resulting solution is filtered to recover white fibers of poly (ether ether dithioacetal). Approximately 0.718 g of poly (ether ether dithioacetal) is recovered, for a yield of approximately 98%.

Figure 3:
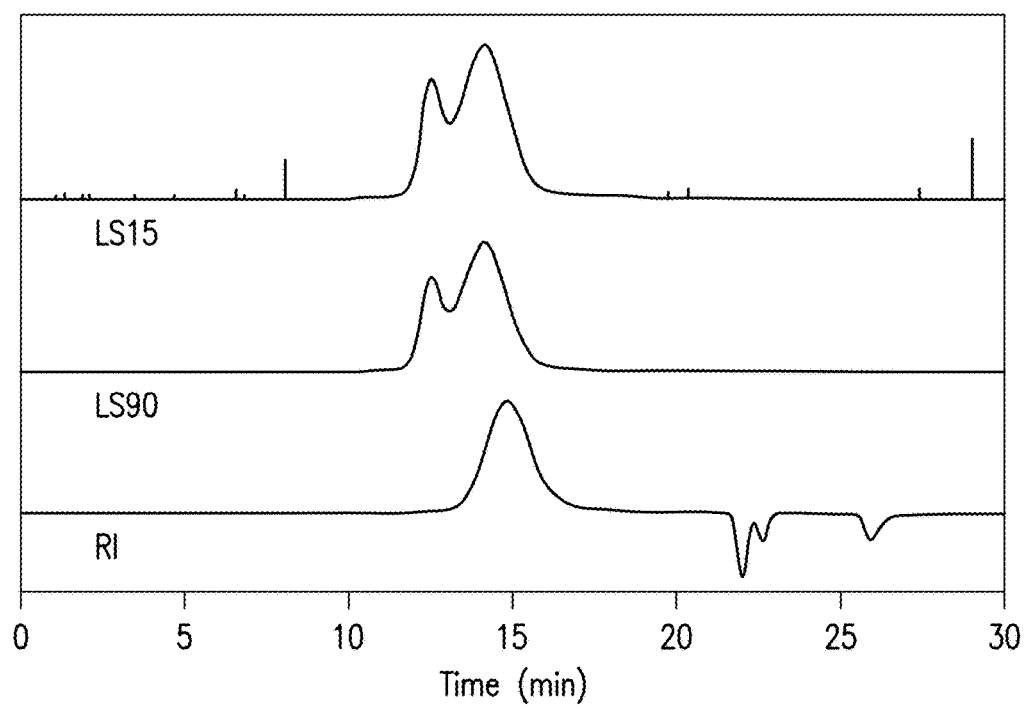
FIG. 3 illustrates GPC traces analyzing the thioacetal formed from protection of PEEK 450G with 1,2-ethanedithiol.

GPC characterization of the poly (ether ether dithioacetal) yields the traces illustrated in FIG. 3. Table 3 below summarizes the measured values of $M_n$, $M_w$ and PDI for both refractive index and light scattering measurements.

The GPC characterization of the poly (ether ether dithioacetal) yields the following results:

$v_{max}$/cm$^{-1}$ 3039 (C—H), 2926 (C—H), 1603 (C—C), 1490 (C—C), 1224 (C—O—C), 1192 (C—H); $\delta_H$ (250 MHz, $CDCl_3$) 3.40 (4H, s, $H_h$), 6.88 (4H, AA'XX', $H_d$), 6.99 (4H, S, $H_b$), 7.53 (4H, AA'XX', $H_e$); $\delta$C (62.5 MHz, $CDCl_3$) 40.7 ($C_h$), 76.5 ($C_g$), 117.6 ($C_d$), 121.2 ($C_b$) 130.2 ($C_f$), 139.3 ($C_e$), 152.8 ($C_c$), 157.4 ($C_a$).

TABLE 3

GPC characterization of poly (ether ether dithioacetal) from PEEK 450G and EDT

|    | RI     | LS      |
|----|--------|---------|
| Mn | 22,700 | 62,000  |
| Mw | 68,500 | 181,300 |
| PDI| 3.02   | 2.92    |

These data demonstrate that the carbonyl groups of the starting material have been removed and that the thioacetal, poly (ether ether dithioacetal), has been formed.

Example 4

PEK and 1,2 Ethanedithiol (EDT)

In Example 4, thioacetalization of PEK is performed using 1,2 ethanedithiol (EDT) according to Reaction (6):

Under a nitrogen atmosphere, approximately 0.393 g (approximately 4.17 mmole) of EDT is added to a stirred solution of approximately 0.392 g of PEK in approximately 25 mL dichloromethane ($CH_2Cl_2$) and about 2 mL trifluoroacetic acid (TFA). The EDT addition is followed by addition of approximately 0.280 g (about 1.97 mmole) boron trifluoride diethyl etherate ($BF_3Et_2O$). The solution is stirred for about 3 days, during which time the solution develops a deep red color. The solution is then poured into about 100 mL cold methanol. The resulting solution is filteredfiltered to recover a fine, white powder of poly (ether dithioacetal). Approximately 0.532 g of poly (ether dithioacetal) is recovered, for a yield of approximately 98%.

Figure 4:
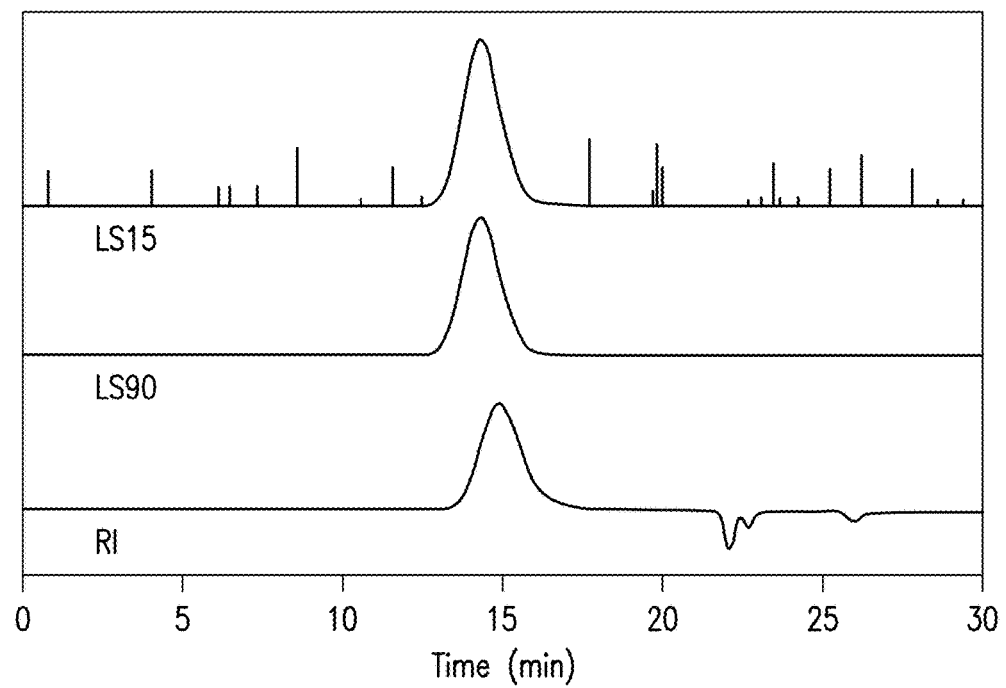
FIG. 4 illustrates GPC traces analyzing the thioacetal formed from protection of PEK with 1,2-ethanedithiol.

GPC characterization of the poly (ether dithioacetal) yields the traces illustrated in FIG. 4. Table 4 below summarizes the measured values of $M_n$, $M_w$ and PDI for both refractive index and light scattering measurements.

The GPC characterization of the poly (ether dithioacetal) yields the following results:

$v_{max}$/cm$^{-1}$ 2926 (C—H), 1711 (C—C), 1595 (C—C), 1496 (C—C), 1241 (C—O—C), 1171 (C—H); $\delta_H$ (250 MHz, $CDCl_3$) 3.39 (4H, s, $H_f$), 6.89 (4H, AA'XX', $H_b$), 7.55 (4H, AA'XX', $H_c$); $\delta$C (62.5 MHz, $CDCl_3$) 40.7 ($C_f$), 76.5 ($C_e$), 118.5 ($C_b$), 130.2 ($C_c$) 139.7 ($C_d$), 156.5 ($C_a$).

TABLE 4

GPC characterization of poly (ether dithioacetal) from PEK and EDT

|    | RI     | LS     |
|----|--------|--------|
| Mn | 32,600 | 13,000 |
| Mw | 63,700 | 42,400 |
| PDI| 1.95   | 3.26   |

These data demonstrate that the carbonyl groups of the starting material have been removed and that the thioacetal, poly (ether dithioacetal), has been formed.

Example 5

PEKK (Grade HTM, from Cytec Inc) and 1,2 Ethanedithiol (EDT)

In Example 5, thioacetalization of PEKK HTM is performed using 1,2 ethanedithiol (EDT) according to Reaction (7):

Reaction 7

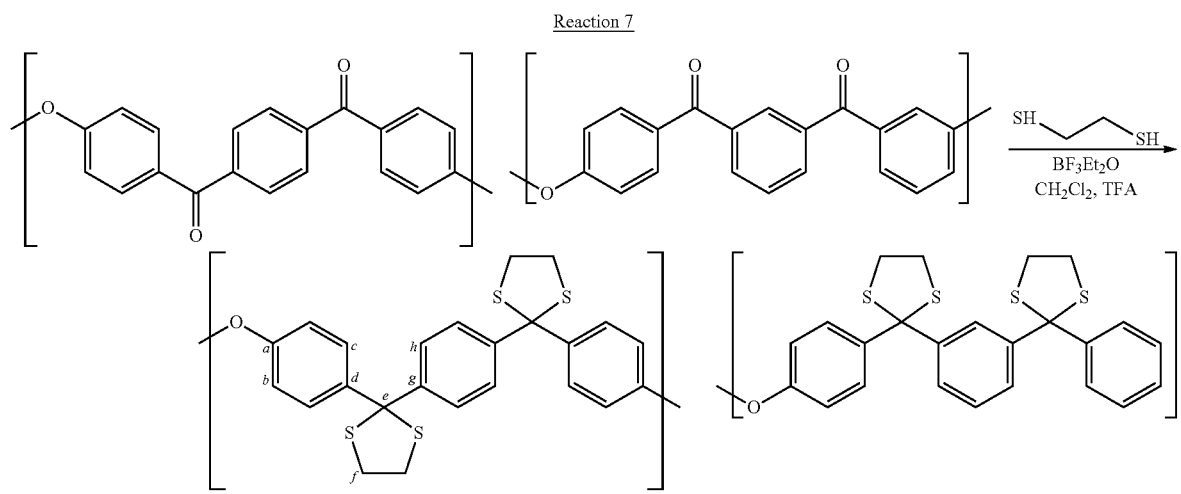

Under a nitrogen atmosphere, approximately 0.752 g (approximately 7.98 mmole) of EDT is added to a stirred solution of approximately 0.600 g of PEKK HTM in approximately 20 mL dichloromethane ($CH_2Cl_2$) and about 2 mL trifluoroacetic acid (TFA). The EDT addition is followed by addition of approximately 0.571 g (about 4.02 mmole) boron trifluoride diethyl etherate ($BF_3Et_2O$). The solution is stirred for about 18 hours, during which time the solution develops a deep red color. The solution is then poured into about 100 mL cold methanol. The resulting solution is filtered to recover white fibers of poly (ether dithioacetal dithioacetal). Approximately 0.899 g of poly (ether dithioacetal dithioacetal) is recovered, for a yield of approximately 99%.

Figure 5:
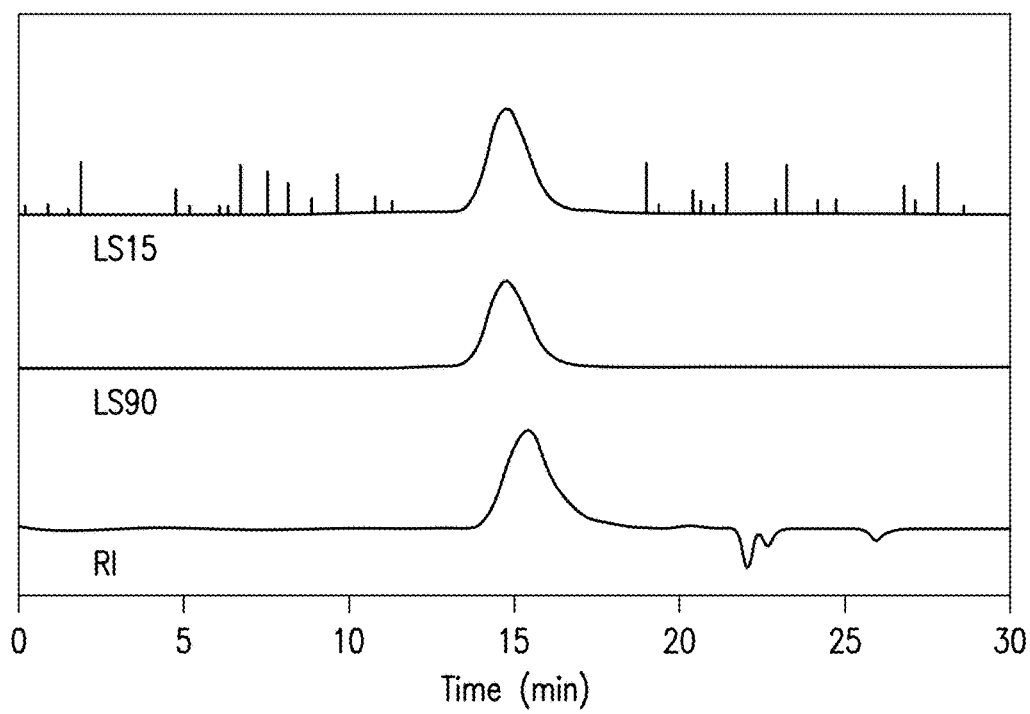
FIG. 5 illustrates GPC traces analyzing the thioacetal formed from protection of PEKK HTM with 1,2-ethanedithiol.

GPC characterization of the poly (ether dithioacetal dithioacetal) yields the traces illustrated in FIG. 5. Table 5 below summarizes the measured values of $M_n$, $M_w$ and PDI for both refractive index and light scattering measurements.

The GPC characterization of the poly (ether dithioacetal dithioacetal) yields the following results:

$v_{max}$/cm$^{-1}$ 3155 (C—H), 2930 (C—H), 1596 (C—C), 1496 (C—C), 1241 (C—O—C), 1173 (C—H), $\delta_H$ (250 MHz, CDCl$_3$) 3.37 (8H, s, H$_f$), 6.87 (4H, AA'XX', H$_b$), 7.51 (8H, AA'XX', H$_c$, H$_h$); $\delta$C (62.5 MHz, CDCl$_3$) 40.6 (C$_f$), 76.5 (C$_e$), 118.5 (C$_f$), 128.3 (C$_h$), 130.2 (C$_c$) 139.6 (C$_d$), 143.8 (C$_g$), 156.5 (C$_a$).

TABLE 5

GPC characterization of poly (ether dithioacetal dithioacetal) from PEKK HTM and EDT

| | RI | LS |
|---|---|---|
| Mn | 16,400 | 13,000 |
| Mw | 37,600 | 29,200 |
| PDI | 2.29 | 2.24 |

These data demonstrate that the carbonyl groups of the starting material have been removed and that the thioacetal, poly (ether dithioacetal dithioacetal), has been formed.

Example 6

PEKK DSM and 1,2 Ethanedithiol (EDT)

In Example 6, thioacetalization of PEKK DSM is performed using 1,2 ethanedithiol (EDT) according to Reaction (8):

Reaction 8

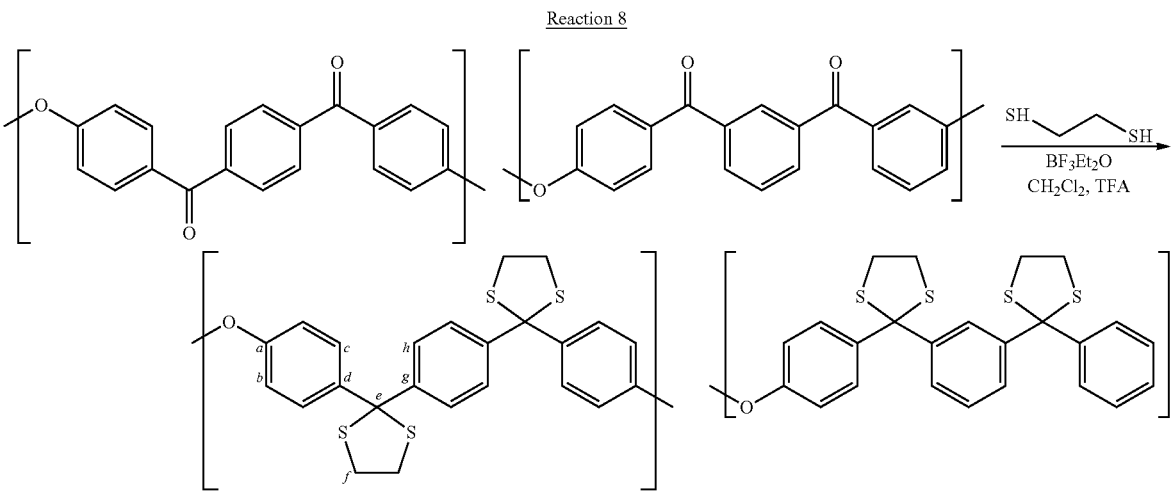

Under a nitrogen atmosphere, approximately 0.752 g (approximately 7.98 mmole) of EDT is added to a stirred solution of approximately 0.600 g of PEKK DSM in approximately 20 mL dichloromethane (CH$_2$Cl$_2$) and about 2 mL trifluoroacetic acid (TFA). The EDT addition is followed by addition of approximately 0.571 g (about 4.02 mmole) boron trifluoride diethyl etherate (BF$_3$Et$_2$O). The solution is stirred for about 18 hours at room temperature, during which time the solution develops a deep red color. The solution is then poured into about 100 mL cold methanol. The resulting solution is filtered to recover white fibers of poly (ether dithioacetal dithioacetal). Approximately 0.888 g of poly (ether dithioacetal dithioacetal) is recovered, for a yield of approximately 98%.

Figure 6:
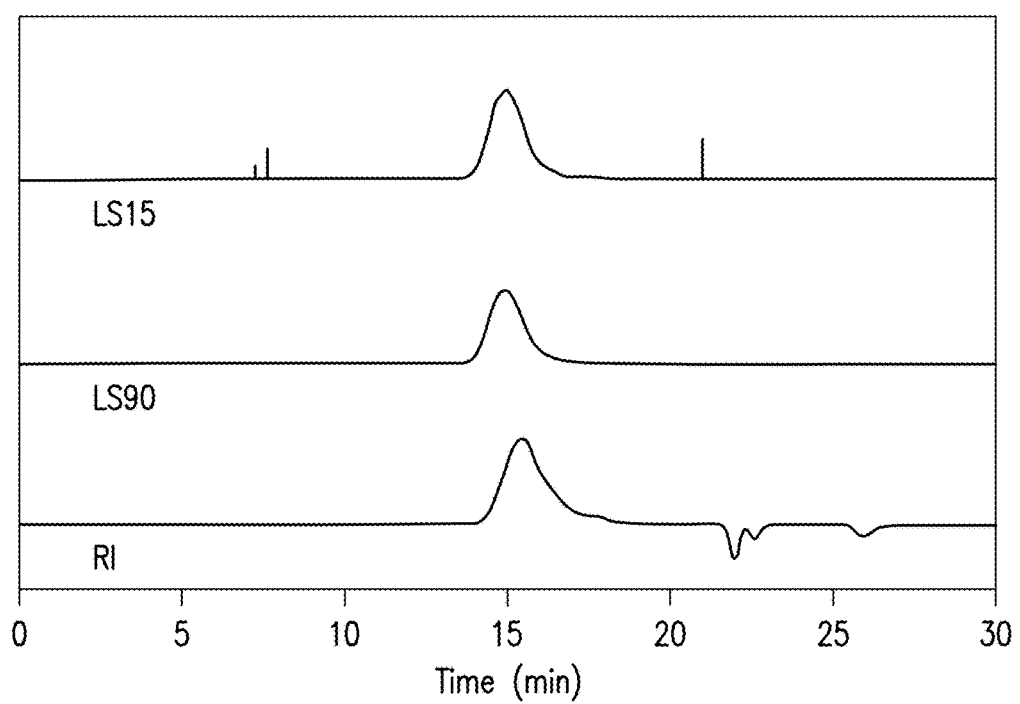
FIG. 6 illustrates GPC traces analyzing the thioacetal formed from protection of PEKK DSM with 1,2-ethanedithiol.

GPC characterization of the poly (ether dithioacetal dithioacetal) yields the traces illustrated in FIG. 6. Table 6 below summarizes the measured values of M$_n$, M$_w$ and PDI for both refractive index and light scattering measurements.

The GPC characterization of the poly (ether dithioacetal dithioacetal) yields the following results:

$v_{max}$/cm$^{-1}$ 3155 (C—H), 2930 (C—H), 1596 (C—C), 1496 (C—C), 1241 (C—O—C), 1173 (C—H), δ$_H$ (250 MHz, CDCl$_3$) 3.37 (8H, s, H$_f$), 6.87 (4H, m, H$_b$) 7.51 (8H, AA'XX', H$_c$, H$_h$); δC (62.5 MHz, CDCl$_3$) 40.6 (C$_f$), 76.5 (C$_e$), 118.5 (C$_f$), 128.3 (C$_h$), 130.2 (C$_c$) 139.6 (C$_d$), 143.8 (C$_g$), 156.5 (C$_a$).

TABLE 6

GPC characterization of poly (ether dithioacetal dithioacetal) from PEKK DSM and EDT

|  | RI | LS |
|---|---|---|
| Mn | 13,200 | 65,600 |
| Mw | 26,200 | 126,800 |
| PDI | 1.98 | 1.93 |

These data demonstrate that the carbonyl groups of the starting material have been removed and that the thioacetal, poly (ether dithioacetal dithioacetal), has been formed.

Example 7

PEKEKK and 1,2 Ethanedithiol (EDT)

In Example 7, thioacetalization of PEKEKK is performed using 1,2 ethanedithiol (EDT) according to Reaction (9):

Reaction 9

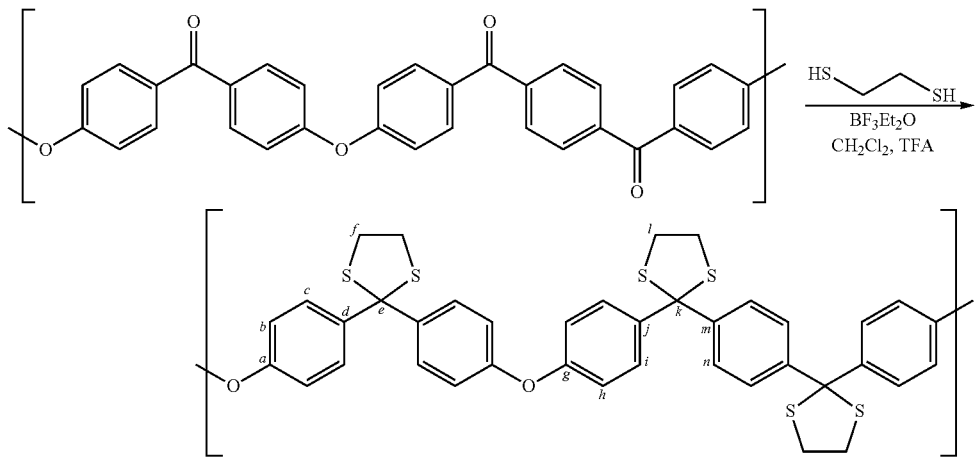

Under a nitrogen atmosphere, approximately 0.561 g (approximately 5.95 mmole) of EDT is added to a stirred solution of approximately 0.496 g of PEKEKK in approximately 20 mL dichloromethane (CH$_2$Cl$_2$) and about 2 mL trifluoroacetic acid (TFA). The EDT addition is followed by addition of approximately 0.426 g (about 3.00 mmole) boron trifluoride diethyl etherate (BF$_3$Et$_2$O). The solution is stirred for about 18 hours at room temperature, during which time the solution develops a deep red color. The solution is then poured into about 100 mL cold methanol. The resulting solution is filtered to recover white fibers of poly (ether dithioacetal ether dithioacetal dithioacetal). Approximately 0.718 g poly (ether dithioacetal ether dithioacetal dithioacetal) is recovered, for a yield of approximately 99%.

Figure 7:
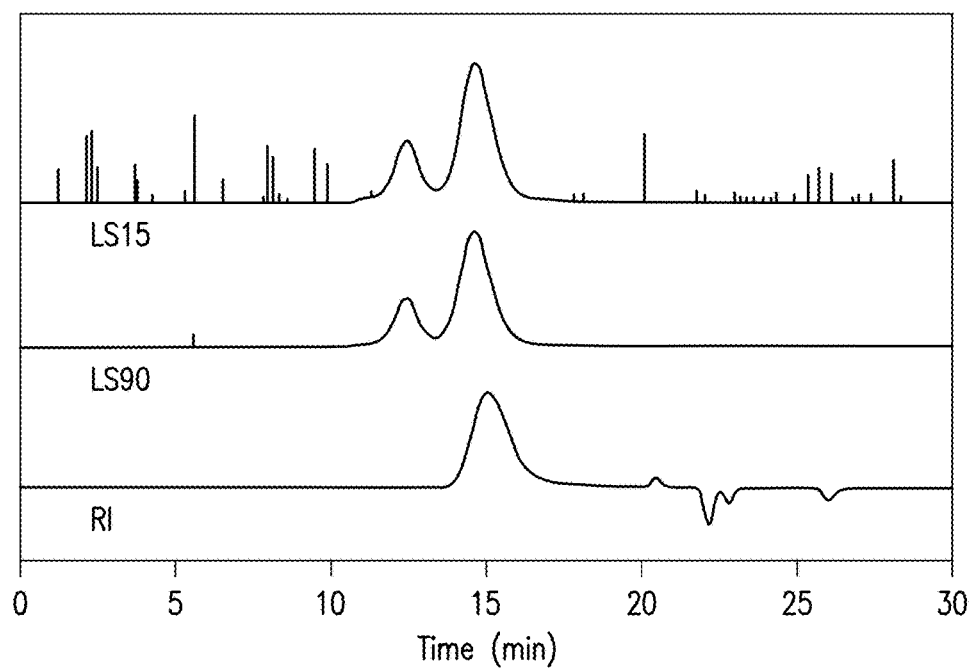
FIG. 7 illustrates GPC traces analyzing the thioacetal formed from protection of PEKEKK with 1,2-ethanedithiol.

GPC characterization of the poly (ether dithioacetal ether dithioacetal dithioacetal) yields the traces illustrated in FIG. 7. Table 7 below summarizes the measured values of M$_n$, M$_w$ and PDI for both refractive index and light scattering measurements.

The GPC characterization of the poly (ether dithioacetal ether dithioacetal dithioacetal) yields the following results:

$v_{max}$/cm$^{-1}$ 2927 (C—H), 1594 (C—C), 1495 (C—C), 1240 (C—O—C), 1172 (C—H), δ$_H$ (250 MHz, CDCl$_3$) 3.37 (12H, m, H$_f$, H$_l$), 6.88 (8H, m, H$_b$, H$_h$) 7.48 (12H, m, H$_c$, H$_i$, H$_n$); δC (62.5 MHz, CDCl$_3$) 40.6 (C$_f$, C$_l$), 76.5 (C$_e$, C$_k$), 118.5 (C$_b$, C$_h$), 128.3 (C$_n$), 130.2 (C$_c$) 139.6 (C$_d$), 143.8 (C$_g$), 156.5 (C$_a$).

TABLE 7

GPC characterization of poly (ether dithioacetal ether dithioacetal dithioacetal) from PEKEKK and EDT

|  | RI | LS |
|---|---|---|
| Mn | 29,600 | 18,100 |
| Mw | 52,400 | 42,700 |
| PDI | 1.77 | 2.35 |

These data demonstrate that the carbonyl groups of the starting material have been removed and that the thioacetal, poly (ether dithioacetal ether dithioacetal dithioacetal), has been formed.

Example 8

PEEK Avecia and 1,3 Propanedithiol (PDT)

In Example 8, thioacetalization of PEEK Avecia is performed using 1,3-propanedithiol (PDT) according to Reaction (10):

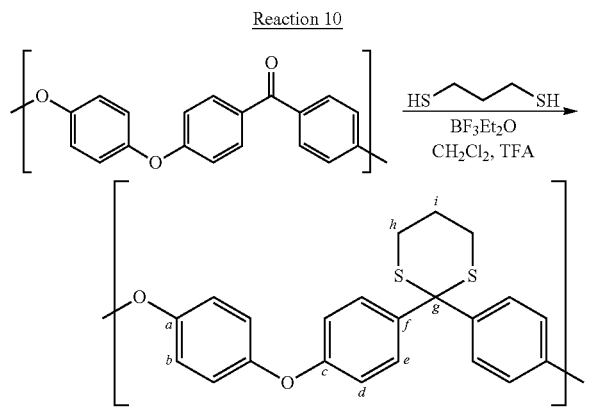

Reaction 10

Under a nitrogen atmosphere, approximately 0.431 g (approximately 3.98 mmole) of PDT is added to a stirred solution of approximately 0.576 g of PEEK Avecia in approximately 20 mL dichloromethane ($CH_2Cl_2$) and about 2 mL trifluoroacetic acid (TEA). The PDT addition is followed by addition of approximately 0.280 g (about 1.97 mmole) boron trifluoride diethyl etherate ($BF_3Et_2O$). The solution is stirred for about 5 days, during which time the solution develops a deep red color. The solution is then poured into about 100 mL cold methanol. The resulting solution is filtered to recover white fibers of poly (ether ether dithioacetal). Approximately 0.705 g of poly (ether ether dithioacetal) is recovered, for a yield of approximately 93%.

Figure 8:
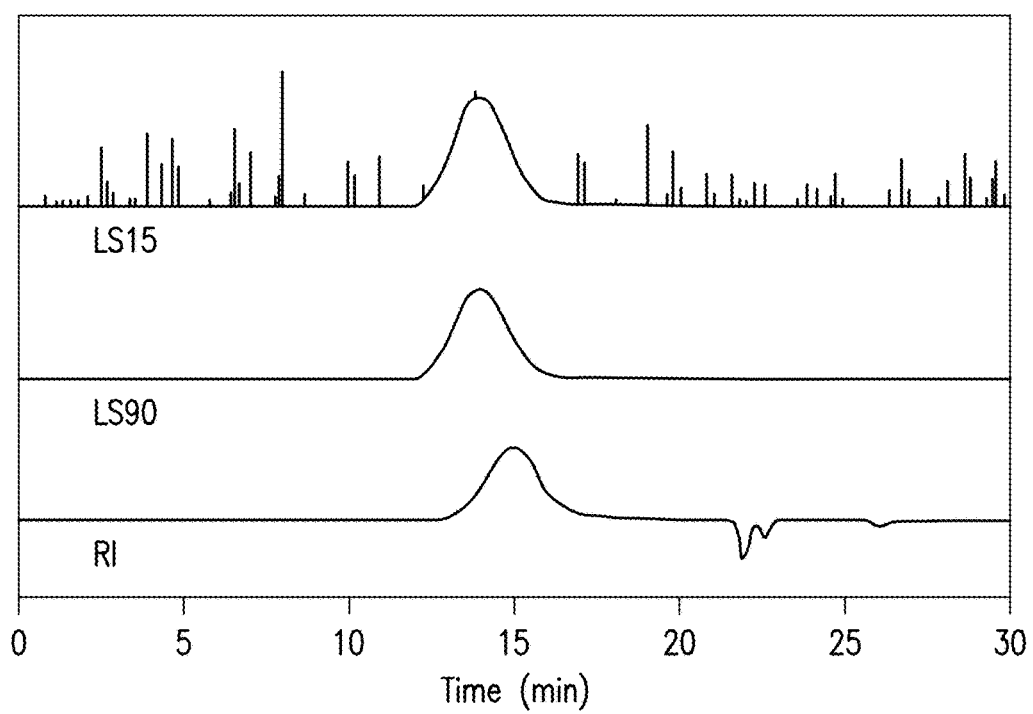
FIG. 8 illustrates GPC traces analyzing the thioacetal formed from protection of PEEK Avecia with 1,3-propanedithiol.

GPC characterization of the poly (ether ether dithioacetal) yields the traces illustrated in FIG. 8. Table 8 below summarizes the measured values of $M_n$, $M_w$ and PDI for both refractive index and light scattering measurements.

The GPC characterization of the poly (ether ether dithioacetal) yields the following results:

$v_{max}$/cm$^{-1}$ 2907 (C—H), 1602 (C—C), 1490 (C—C), 1225 (C—O—C), 1192 (C—H); $\delta_H$ (250 MHz, CDCl$_3$) 1.99 (2H, br, H$_i$), 2.76 (4H, br, H$_h$) 6.92 (4H, AA'XX', H$_d$), 7.02 (4H, s, H$_b$), 7.59 (4H, AA'XX', H$_e$); $\delta$C (62.5 MHz, CDCl$_3$) 24.8 (C$_i$), 29.9 (C$_h$), 62.2 (C$_g$), 117.9 (C$_d$), 121.4 (C$_b$) 131.3 (C$_f$), 137.3 (C$_e$), 152.8 (C$_c$), 157.6 (C$_a$).

TABLE 8

GPC characterization of poly (ether ether dithioacetal) from PEEK Avecia and PDT

|  | RI | LS |
|---|---|---|
| Mn | 28,000 | 10,100 |
| Mw | 75,500 | 38,400 |
| PDI | 2.7 | 3.8 |

These data demonstrate that the carbonyl groups of the starting material have been removed and that the thioacetal, poly (ether ether dithioacetal), has been formed.

Example 9

PEEK 150G and 1,3-Propanedithiol (PDT)

In Example 9, thioacetalization of PEEK 150G is performed using 1,3 propanedithiol (PDT) according to Reaction (11):

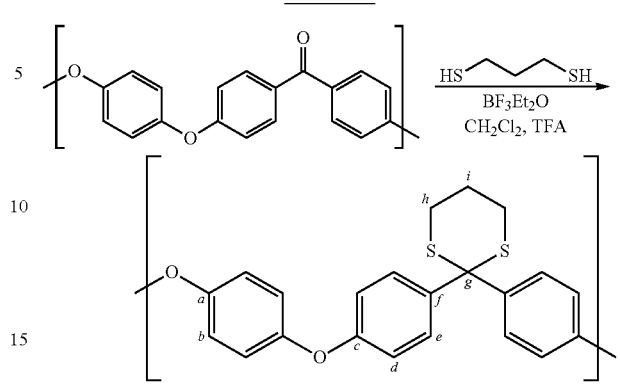

Reaction 11

Under a nitrogen atmosphere, approximately 0.431 g (approximately 3.98 mmole) of PDT is added to a stirred solution of approximately 0.576 g of PEEK 150G in approximately 20 mL dichloromethane ($CH_2Cl_2$) and about 2 mL trifluoroacetic acid (TFA). The PDT addition is followed by addition of approximately 0.280 g (about 1.97 mmole) boron trifluoride diethyl etherate ($BF_3Et_2O$) The solution is stirred for about 3 days, during which time the solution develops a deep red color The solution is then poured into about 100 mL cold methanol. The resulting solution is filtered to recover white fibers of poly (ether ether dithioacetal). Approximately 0.737 g of poly (ether ether dithioacetal) is recovered, for a yield of approximately 98%.

Figure 9:
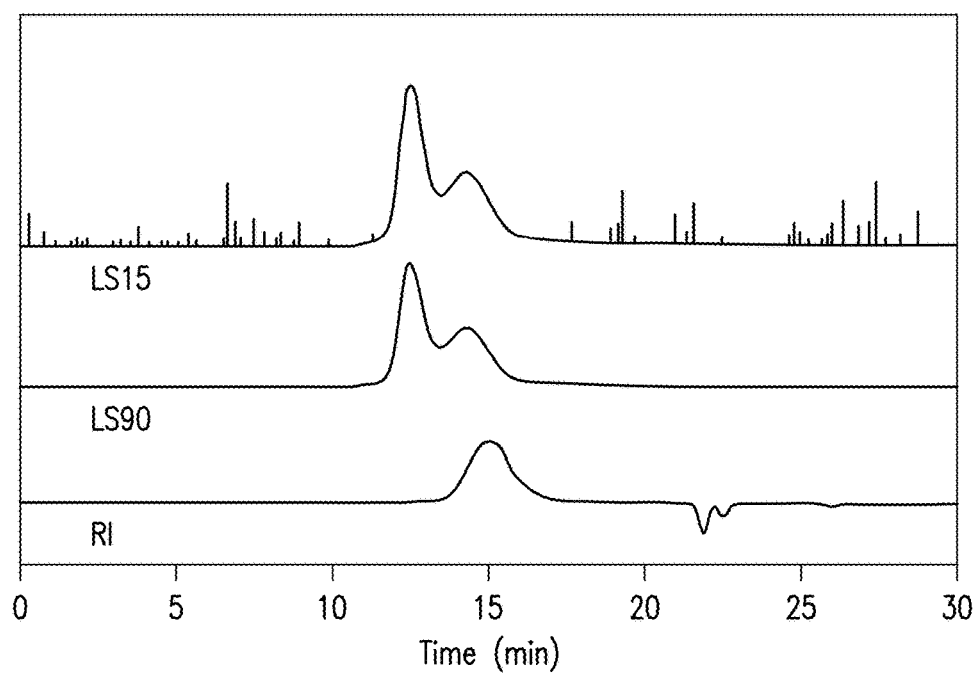
FIG. 9 illustrates GPC traces analyzing the thioacetal formed from protection of PEEK 150G with 1,3-propanedithiol.

GPC characterization of the poly (ether ether dithioacetal) yields the traces illustrated in FIG. 9. Table 9 below summarizes the measured values of $M_n$, $M_w$ and PDI for both refractive index and light scattering measurements.

The GPC characterization of the poly (ether ether dithioacetal) yields the following results:

$v_{max}$/cm$^{-1}$3155 (C—H), 2908 (C—H), 1602 (C—C), 1492 (C—C), 1226 (C—O—C), $\delta_H$ (250 MHz, CDCl$_3$) 1.99 (2H, br, H$_i$), 2.76 (4H, br, H$_h$), 6.92 (4H, AA'XX', H$_d$), 7.02 (4H, s, H$_b$), 7.59 (4H, AA'XX', H$_e$); $\delta$C (62.5 MHz, CDCl$_3$) 24.8 (C$_i$), 29.9 (C$_h$), 62.2 (C$_g$), 117.9 (C$_d$), 121.4 (C$_b$) 131.3 (C$_f$), 137.3 (C$_e$), 152.8 (C$_c$), 157.6 (C$_a$).

TABLE 9

GPC characterization of poly (ether ether dithioacetal) from PEEK 150G and PDT

|  | RI | LS |
|---|---|---|
| Mn | 25,700 | 13,400 |
| Mw | 72,800 | 72,200 |
| PDI | 2.83 | 5.39 |

These data demonstrate that the carbonyl groups of the starting material have been removed and that the thioacetal, poly (ether ether dithioacetal), has been formed.

Example 10

PEEK 450G and 1,3-Propanedithiol (PDT)

In Example 10, thioacetalization of PEEK 450G is performed using 1,3 propanedithiol (PDT) according to Reaction (12):

Reaction 12

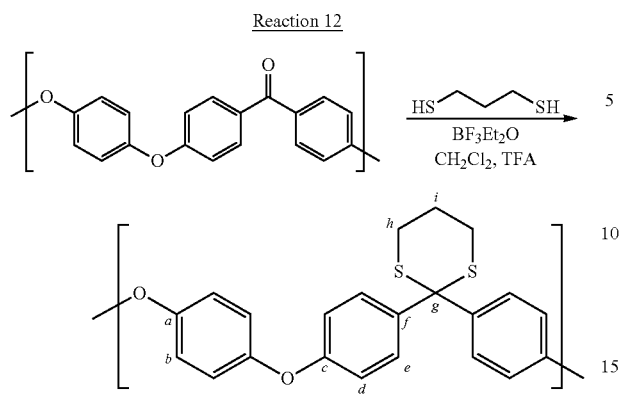

Reaction 13

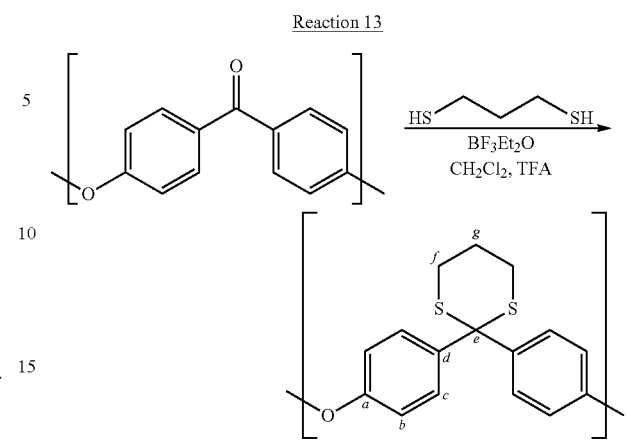

Under a nitrogen atmosphere, approximately 0.431 g (approximately 3.98 mmole) of PDT is added to a stirred solution of approximately 0.576 g of PEEK 450G in approximately 20 mL dichloromethane ($CH_2Cl_2$) and about 2 mL trifluoroacetic acid (TFA). The PDT addition is followed by addition of approximately 0.280 g (about 1.97 mmole) boron trifluoride diethyl etherate ($BF_3Et_2O$). The solution is stirred for about 3 days, during which time the solution develops a deep red color. The solution is then poured into about 100 mL cold methanol. The resulting solution is filtered to recover white fibers of poly (ether ether dithioacetal). Approximately 0.727 g of poly (ether ether dithioacetal) is recovered, for a yield of approximately 96%.

Figure 10:
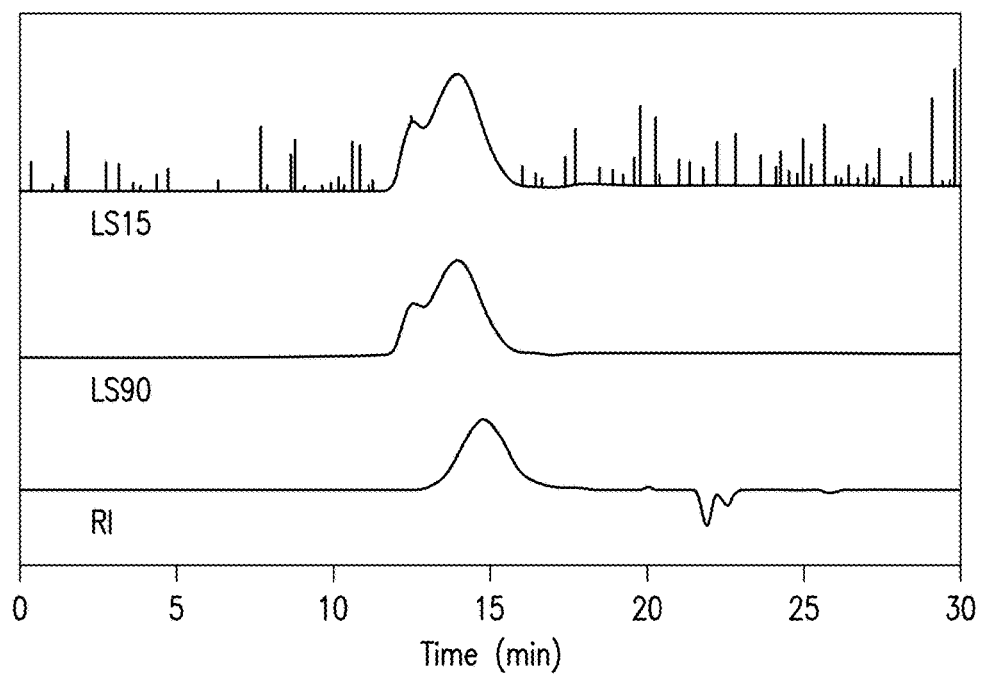
FIG. 10 illustrates GPC traces analyzing the thioacetal formed from protection of PEEK 450G with 1,3-propanedithiol.

GPC characterization of the poly (ether ether dithioacetal) yields the traces illustrated in FIG. 10. Table 10 below summarizes the measured values of $M_n$, $M_w$ and PDI for both refractive index and light scattering measurements.

The GPC characterization of the poly (ether ether dithioacetal) yields the following results:

$v_{max}$/cm$^{-1}$ 3155 (C—H), 2908 (C—H), 1711 (C—C), 1602 (C—C), 1492 (C—C), 1225 (C—O—C), $\delta_H$ (250 MHz, CDCl$_3$) 2.00 (2H, br, H$_i$), 2.78 (4H, br, H$_h$), 6.90 (4H, AA'XX', H$_d$), 7.02 (4H, s, H$_b$), 7.59 (4H, AA'XX', H$_e$); $\delta$C (62.5 MHz, CDCl$_3$) 24.8 (C$_i$), 29.9 (C$_h$), 62.2 (C$_g$), 117.9 (C$_d$), 121.4 (C$_b$) 131.3 (C$_f$), 137.3 (C$_e$), 152.8 (C$_c$), 157.6 (C$_a$).

TABLE 10

GPC characterization of poly (ether ether dithioacetal) from PEEK 1450G and PDT

|     | RI     | LS     |
|-----|--------|--------|
| Mn  | 32,800 | 13,500 |
| Mw  | 97,800 | 50,900 |
| PDI | 2.98   | 3.77   |

These data demonstrate that the carbonyl groups of the starting material have been removed and that the thioacetal, poly (ether ether dithioacetal), has been formed.

Example 11

PEK and 1,3-Propanedithiol (PDT)

In Example 11, thioacetalization of PEK is performed using 1,3 propanedithiol (PDT) according to Reaction (13):

Under a nitrogen atmosphere, approximately 0.431 g (approximately 3.98 mmole) of PDT is added to a stirred solution of approximately 0.392 g of PEK in approximately 20 mL dichloromethane ($CH_2Cl_2$) and about 2 mL trifluoroacetic acid (TFA). The PDT addition is followed by addition of approximately 0.280 g (about 1.97 mmole) boron trifluoride diethyl etherate ($BF_3Et_2O$). The solution is stirred for about 3 days, during which time the solution develops a deep red color. The solution is then poured into about 100 mL cold methanol. The resulting solution is filtered to recover a fine white powder of poly (ether dithioacetal). Approximately 0.558 g of poly (ether dithioacetal) is recovered, for a yield of approximately 97%.

Figure 11:
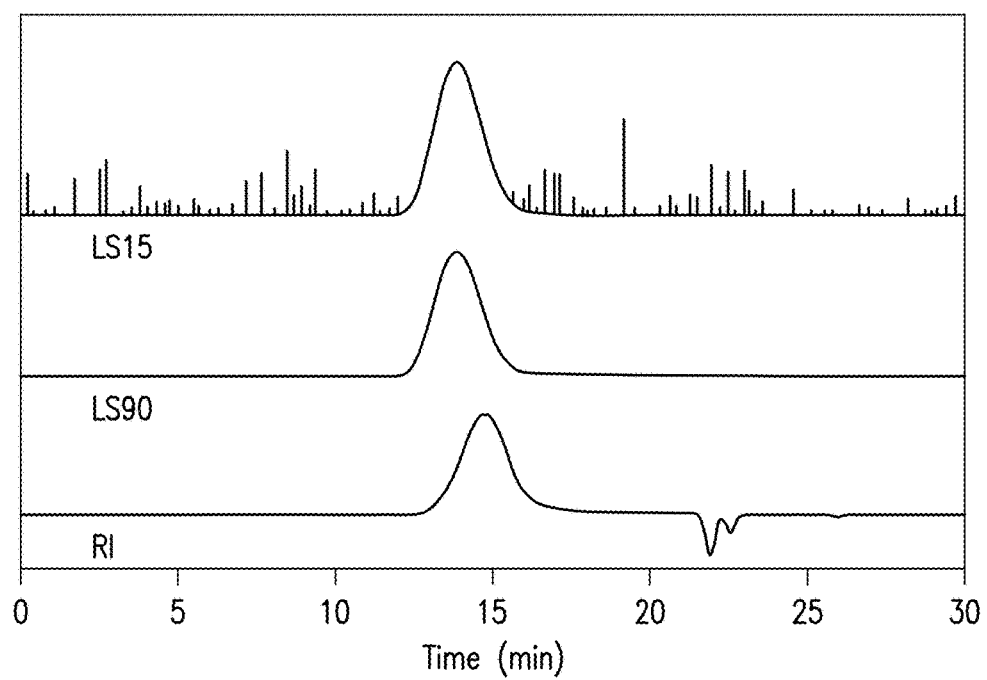
FIG. 11 illustrates GPC traces analyzing the thioacetal formed from protection of PEK with 1,3-propanedithiol.

GPC characterization of the poly (ether dithioacetal) yields the traces illustrated in FIG. 11. Table 11 below summarizes the measured values of $M_n$, $M_w$ and PDI for both refractive index and light scattering measurements.

The GPC characterization of the poly (ether dithioacetal) yields the following results:

$v_{max}$/cm$^{-1}$ 2926 (C—H), 1711 (C—C), 1595 (C—C), 1496 (C—C), 1241 (C—O—C), 1171 (C—H); $\delta_H$ (250 MHz, CDCl$_3$) 2.00 (2H, br, H$_i$), 2.76 (4H, br, H$_f$), 6.97 (4H, AA'XX', H$_b$), 7.65 (4H, AA'XX', H$_c$); $\delta$C (62.5 MHz, CDCl$_3$) 24.8 (C$_g$), 29.9 (C$_f$), 62.3 (C$_e$), 119.0 (C$_b$), 131.3 (C$_c$), 137.9 (C$_d$), 156.6 (C$_a$).

TABLE 11

GPC characterization of poly (ether dithioacetal) from PEK and PDT

|     | RI     | LS     |
|-----|--------|--------|
| Mn  | 39,500 | 11,900 |
| Mw  | 92,600 | 48,500 |
| PDI | 2.34   | 4.08   |

These data demonstrate that the carbonyl groups of the starting material have been removed and that the thioacetal, poly (ether dithioacetal), has been formed.

Example 12

PEKK HTM and 1,3 Propanedithiol (PDT)

In Example 12, thioacetalization of PEKK HTM is performed using 1,3-propanedithiol (PDT) according to Reaction (14):

Reaction 14

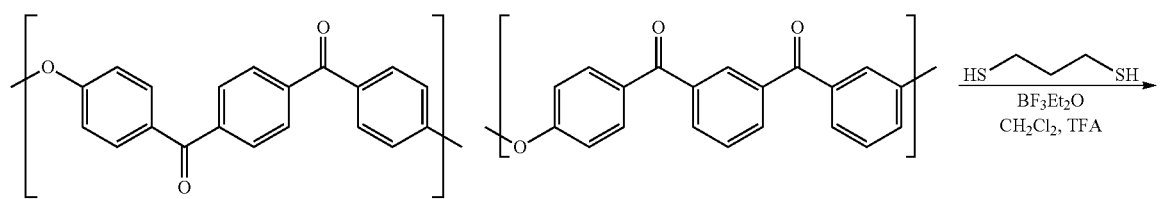

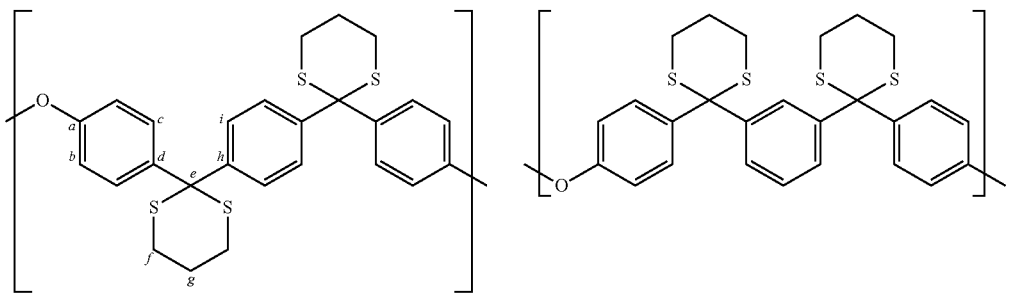

Under a nitrogen atmosphere, approximately 0.852 g (approximately 7.96 mmole) of PDT is added to a stirred solution of approximately 0.600 g of PEKK HTM in approximately 20 mL dichloromethane (CH$_2$Cl$_2$) and about 2 mL trifluoroacetic acid (TFA). The PDT addition is followed by addition of approximately 0.571 g (about 4.02 mmole) boron trifluoride diethyl etherate (BF$_3$Et$_2$O). The solution is stirred for about four days, during which time the solution develops a deep red color. The solution is then poured into about 100 mL cold methanol. The resulting solution is filtered to recover white fibers of poly (ether dithioacetal dithioacetal). Approximately 0.788 g of poly (ether ether dithioacetal) is recovered, for a yield of approximately 82%.

Figure 12:
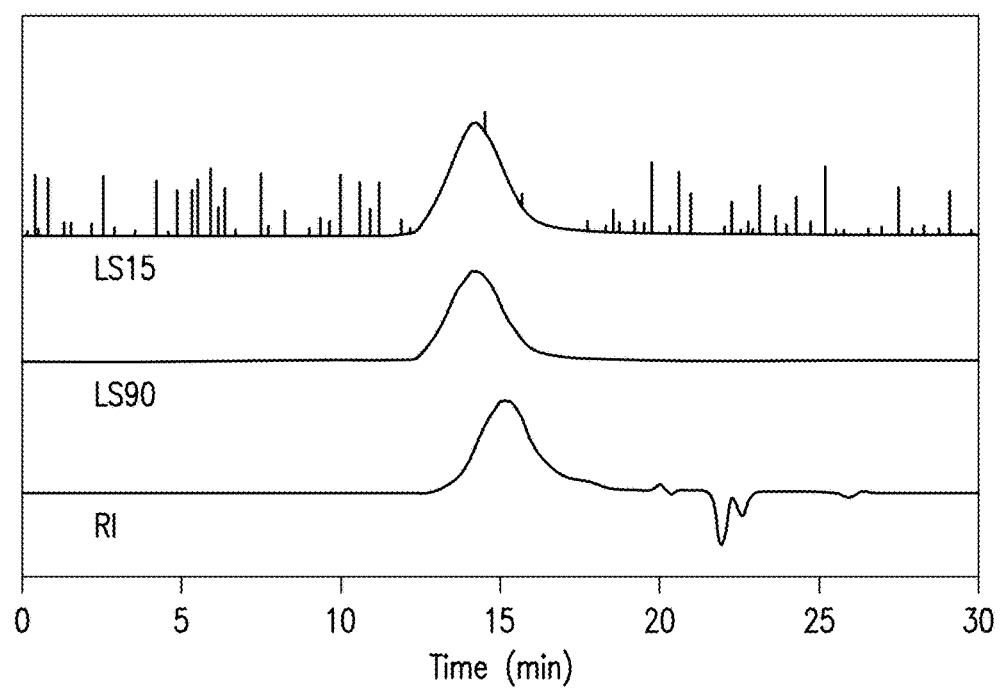
FIG. 12 illustrates GPC traces analyzing the thioacetal formed from protection of PEKK HTM with 1,3-propanedithiol.

GPC characterization of the poly (ether dithioacetal dithioacetal) yields the traces illustrated in FIG. 12. Table 12 below summarizes the measured values of $M_n$, $M_w$ and PDI for both refractive index and light scattering measurements.

The GPC characterization of the poly (ether dithioacetal dithioacetal) yields the following results:

$v_{max}$/cm$^{-1}$ 2904 (C—H), 1593 (C—C), 1494 (C—C), 1241 (C—O—C), 1172 (C—H), $\delta_H$ (250 MHz, CDCl$_3$) 1.99 (4H, br, H$_g$), 2.76 (8H, s, H$_f$), 6.96 (4H, m, H$_b$), 7.55 (8H, AA'XX', H$_c$, H$_h$); $\delta$C (62.5 MHz, CDCl$_3$) 24.8 (C$_g$), 29.8 (C$_f$), 62.3 (C$_e$), 119.0 (C$_f$) 129.6 (C$_h$), 131.2 (C$_c$) 137.5 (C$_d$), 142.5 (C$_g$), 156.5 (C$_a$).

TABLE 12

GPC characterization of poly (ether ether dithioacetal) from PEKK HTM and PDT

|     | RI     | LS     |
| --- | ------ | ------ |
| Mn  | 23,200 | 30,500 |
| Mw  | 67,700 | 71,000 |
| PDI | 2.92   | 2.33   |

These data demonstrate that the carbonyl groups of the starting material have been removed and that the thioacetal, poly (ether dithioacetal dithioacetal), has been formed.

Example 13

PEKK DSM and 1,3-Propanedithiol (PDT)

In Example 6, thioacetalization of PEKK DSM is performed using 1,3-propanedithiol (PDT) according to Reaction (15):

Reaction 15

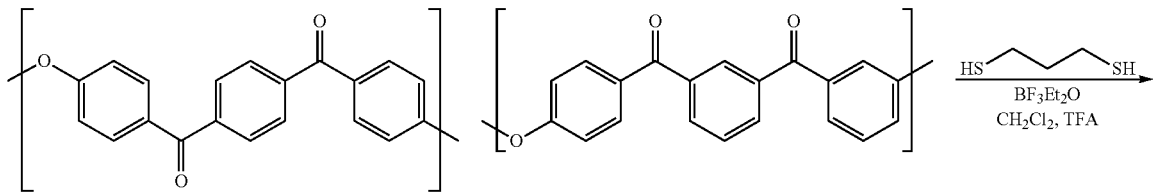

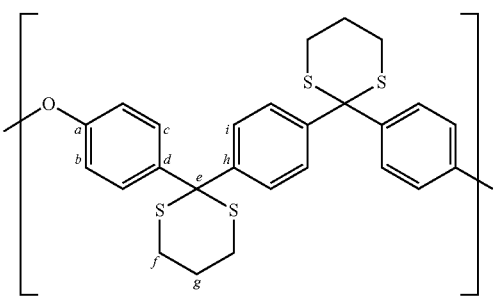
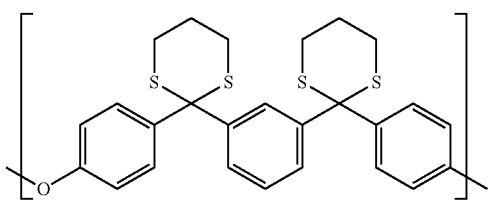

Under a nitrogen atmosphere, approximately 0.647 g (approximately 5.98 mmole) of PDT is added to a stirred solution of approximately 0.600 g of PEKK DSM in approximately 20 mL dichloromethane ($CH_2Cl_2$) and about 2 mL trifluoroacetic acid (TFA). The PDT addition is followed by addition of approximately 0.426 g (about 3.00 mmole) boron trifluoride diethyl etherate ($BF_3Et_2O$). The solution is stirred for about 3 days at room temperature, during which time the solution develops a deep red color. The solution is then poured into about 100 mL cold methanol. The resulting solution is filtered to recover white fibers of poly (ether dithioacetal dithioacetal). Approximately 0.0.742 g of poly (ether dithioacetal dithioacetal) is recovered, for a yield of approximately 97%.

Figure 13:
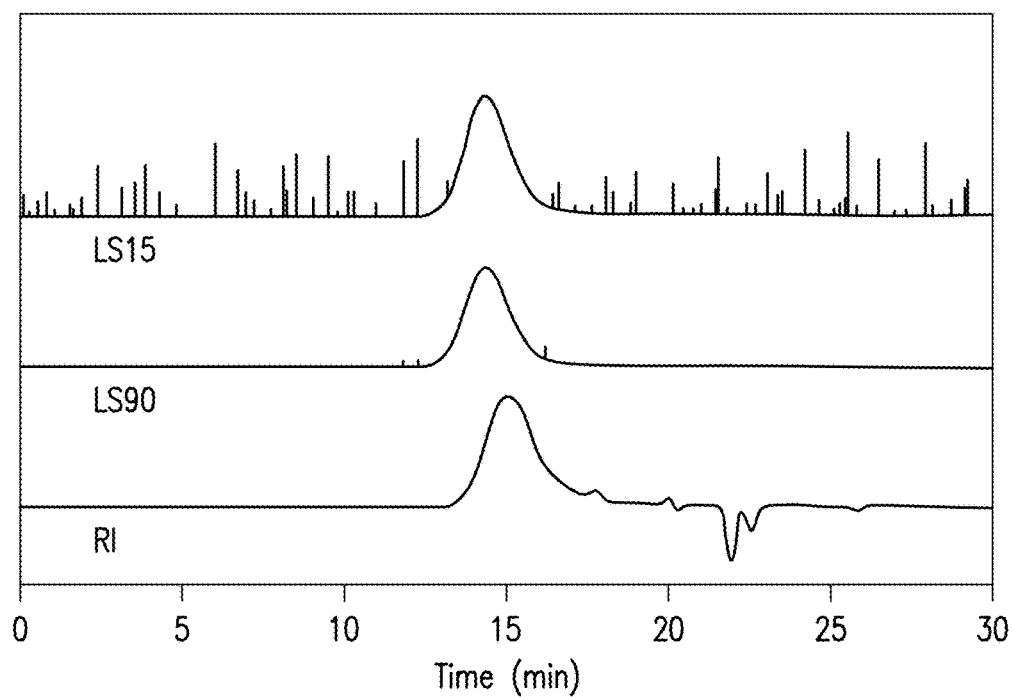
FIG. 13 illustrates GPC traces analyzing the thioacetal formed from protection of PEKK DSM with 1,3-propanedithiol.

GPC characterization of the poly (ether dithioacetal dithioacetal) yields the traces illustrated in FIG. 13. Table 13 below summarizes the measured values of $M_n$, $M_w$ and PDI for both refractive index and light scattering measurements.

The GPC characterization of the poly (ether dithioacetal dithioacetal) yields the following results:

$\nu_{max}$/cm$^{-1}$ 2908 (C—H), 1594 (C—C), 1495 (C—C), 1242 (C—O—C), 1173 (C—H), $\delta_H$ (250 MHz, CDCl$_3$) 1.98 (4H, br, H$_g$), 2.75 (8H, br, H$_f$), 6.96 (4H, m, H$_b$) 7.62 (8H, AA'XX', H$_c$, H$_h$); $\delta$C (62.5 MHz, CDCl$_3$) 24.8 (C$_g$), 29.8 (C$_f$), 62.3 (C$_e$), 119.0 (C$_f$), 129.6 (C$_h$), 131.2 (C$_c$) 137.5 (C$_d$), 142.5 (C$_g$), 156.6 (C$_a$).

TABLE 13

GPC characterization of poly (ether dithioacetal dithioacetal) from PEKK DSM and EDT

|     | RI     | LS     |
| --- | ------ | ------ |
| Mn  | 23,000 | 15,500 |
| Mw  | 57,700 | 35,000 |
| PDI | 2.51   | 2.26   |

These data demonstrate that the carbonyl groups of the starting material have been removed and that the thioacetal, poly (ether dithioacetal dithioacetal), has been formed.

Example 14

PEKEKK and 1,3-Propanedithiol (PDT)

In Example 14, thioacetalization of PEKEKK is performed using 1,3-propanedithiol (PDT) according to Reaction (16):

Reaction 16

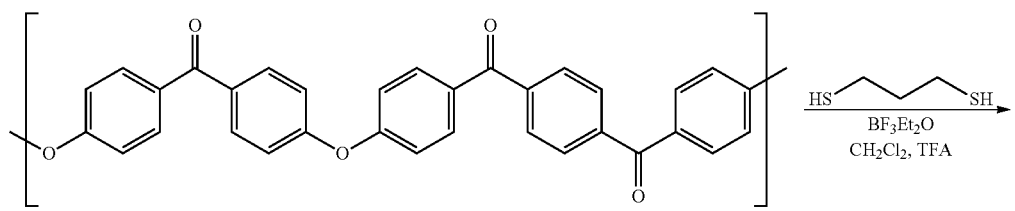

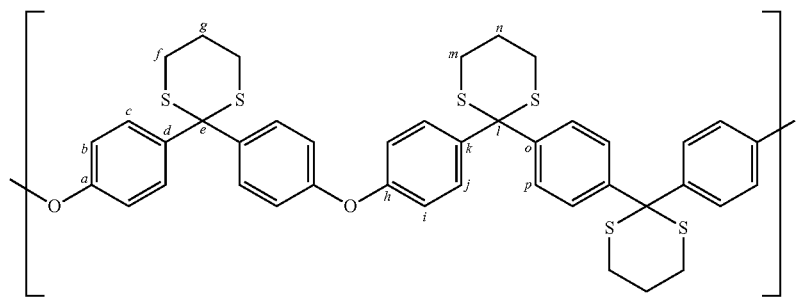

Under a nitrogen atmosphere, approximately 0.561 g (approximately 5.95 mmole) of PDT is added to a stirred solution of approximately 0.496 g of PEKEKK in approximately 20 mL dichloromethane (CH$_2$Cl$_2$) and about 2 mL trifluoroacetic acid (TFA). The PDT addition is followed by addition of approximately 0.426 g (about 3.00 mmole) boron trifluoride diethyl etherate (BF$_3$Et$_2$O). The solution is stirred for about 18 hours at room temperature, during which time the solution develops a deep red color. The solution is then poured into about 100 mL cold methanol. The resulting solution is filtered to recover white fibers of poly (ether dithioacetal ether dithioacetal dithioacetal). Approximately 0.718 g poly (ether dithioacetal ether dithioacetal dithioacetal) is recovered, for a yield of approximately 99%.

Figure 14:
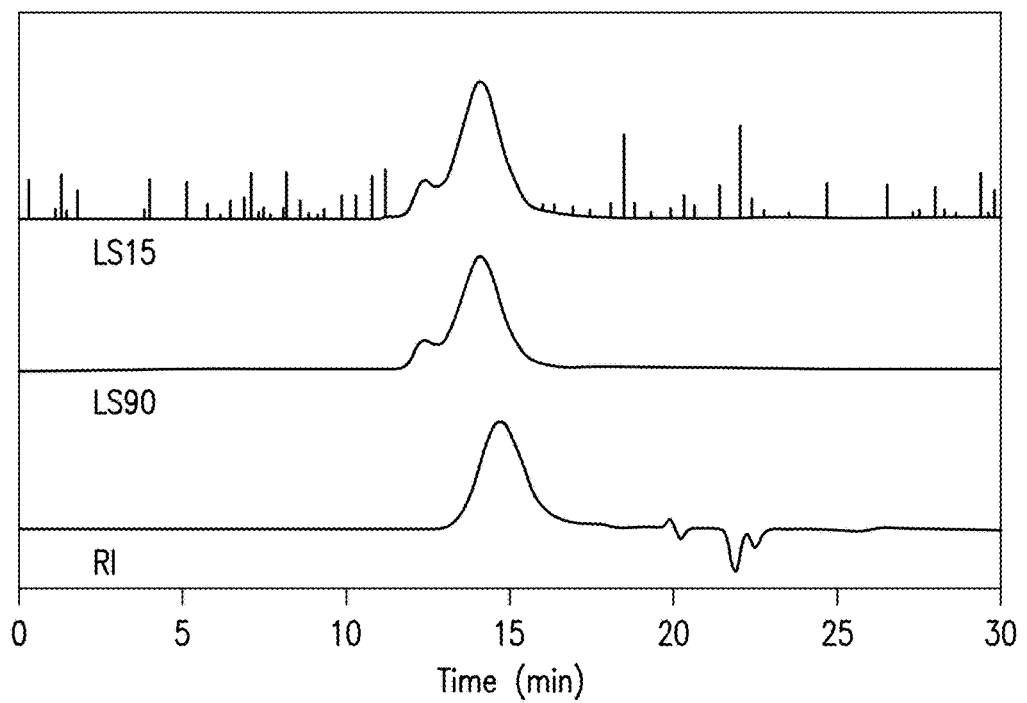
FIG. 14 illustrates GPC traces analyzing the thioacetal formed from protection of PEKEKK with 1,3-propanedithiol.

GPC characterization of the poly (ether dithioacetal ether dithioacetal dithioacetal) yields the traces illustrated in FIG. 14. Table 14 below summarizes the measured values of $M_n$, $M_w$ and PDI for both refractive index and light scattering measurements.

The GPC characterization of the poly (ether dithioacetal ether dithioacetal dithioacetal) yields the following results: $\nu_{max}$/cm$^{-1}$ 2908 (C—H), 1594 (C—C), 1494 (C—C), 1240 (C—O—C), 1172 (C—H), $\delta_H$ (250 MHz, CDCl$_3$) 1.99 (6H, br, H$_g$, H$_n$), 2.77 (12 H, m, H$_f$, H$_m$), 7.06 (8H, m, H$_b$, H$_i$), 7.61 (12H, m, H$_c$, H$_l$, H$_p$); $\delta$C (62.5 MHz, CDCl$_3$) 24.8 (C$_g$, C$_n$), 29.8 (C$_f$, C$_m$), 62.3 (C$_e$, C$_l$), 119.0 (C$_b$, C$_i$), 129.6 (C$_p$), 131.3 (C$_c$) 137.9 (C$_d$), 142.5 (C$_h$), 156.5 (C$_a$).

TABLE 14

GPC characterization of poly (ether dithioacetal ether dithioacetal dithioacetal) from PEKEKK and PDT

|     | RI     | LS     |
|-----|--------|--------|
| Mn  | 37,100 | 17,500 |
| Mw  | 71,500 | 42,300 |
| PDI | 1.93   | 2.42   |

These data demonstrate that the carbonyl groups of the starting material have been removed and that the thioacetal, poly (ether dithioacetal ether dithioacetal dithioacetal), has been formed.

EXAMPLES

Deprotection of thioacetal derivatives of PEEK

In the following examples, thioacetal derivatives of PEEK, poly (ether ether thioacetals) or PEETs, are deprotected, recovering the PEEK materials. GPC of a virgin PEEK Avecia, used to form the thioacetal derivative, is performed in a mixture of phenol and 1,2,4-trichlorobenzene at about 115° C. Molecular weights are measured against polystyrene standards and inherent viscosity is measured in 98% concentrated sulfuric acid at about 25° C.

The PEEK Avecia is provided as a white powder having approximately the following characteristics: T$_g$=142° C., T$_c$=166, T$_m$=344° C., M$_n$=31,100, M$_w$=78,100, PDI=2.5; $\eta_{inh}$=0.82, $\delta_H$ (250 MHz, CDCl$_3$+TFA 6:1); 7.13 (4H, AA'XX'), 7.20 (4H, s), 7.84 (4H, AA'XX'); $\delta$C (62.5 MHz, CDCl$_3$+TFA 6:1) 117.4, 122.6, 130.4, 130.9, 133.9, 152.2, 163.5, 200.0

Example 15

PEEK Avecia Protected by 1,3-propanedithiol

In Example 15, a solution of PEEK Avecia protected by 1,3-propanedithiol (FP4-95) is subjected to a de-protection reaction (Reaction 17) in order to recover the PEEK Avecia.

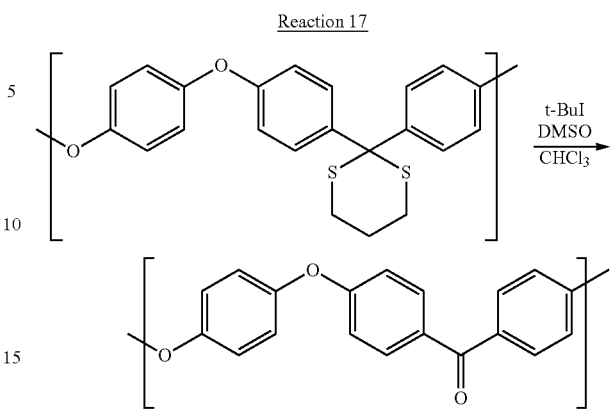

Reaction 17

A mixture of about 0.926 g (approximately 5.03 mmole) of 2-iodo-2-methylpropane (also referred to as t-butyl iodide or t-BuI) and about 0.781 g (approximately 10.00 mmole) dimethylsulfoxide (DMSO) at a temperature of about 70° C. is added to a solution of PEEK Avecia protected by about 0.189 g 1,3-propanedithiol FP4-95 in about 20 mL of chloroform (CHCl$_3$). After approximately 48 hours under reflux, the mixture is left to cool to about room temperature and poured into about 100 mL cold methanol. About 0.142 g of poly (ether ether ketone) is recovered on filtration as a grey powder, which represents a yield of about 99%.

The recovered PEEK is found to have approximately the following properties: T$_g$=143° C., T$_c$=176, T$_m$=334° C., M$_n$=30,300, M$_w$=77,900, PDI=2.6; $\eta_{inh}$=0.82, $\delta_H$ (250 MHz, CDCl$_3$+TFA 6:1); 7.13 (4H, AA'XX'), 7.20 (4H, s), 7.84 (4H, AA'XX'); $\delta$C (62.5 MHz, CDCl$_3$+TFA 6:1) 117.4, 122.6, 130.4, 130.9, 133.9, 152.2, 163.5, 200.0

These data demonstrate that the deprotected PEET compound recovered is substantially the same as the starting PEEK. Significantly, it may be noted that the inherent viscosity of the recovered material in sulfuric acid and that of the starting PEEK are substantially identical, 0.82. This result indicates that the solubilization of PAEKs through thioacetalization can be achieved without substantial chain degradation, thus providing a tool for analysis of these normally difficult to solubilize polymers by GPC.

Figure 15:
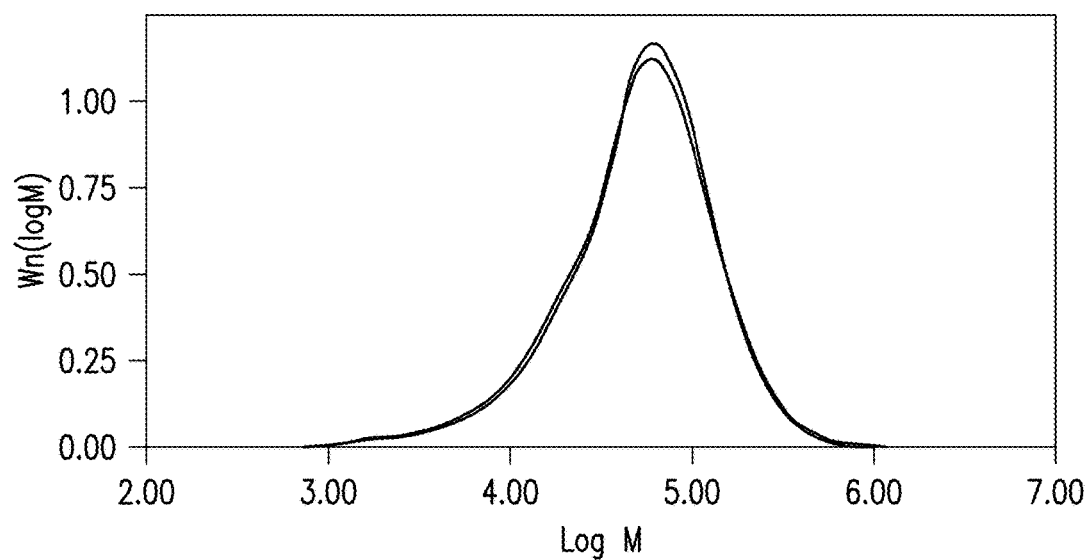
FIG. 15 presents a measurement of molecular weight distribution before and after dithioacetalization of PEEK, illustrating that the weight distribution exhibits substantially little change between the starting and final PEEK materials; and This thioacetalization and acetalization reactions are used extensively in organic synthesis for small molecules as a protecting group and tool to effect further organic transformations. The protection of ketones with thiols or alcohols and their subsequent deprotections are well known and are extensively documented. The reaction is however not known to be used with polymers to impart solubility. This use of the reaction is considered novel although the reaction themselves are well known.

To further verify this conclusion, GPC analysis is performed on the starting PEEK and regenerated PEEK. The molecular weight distributions measured for each in THF at approximately 40° C. are illustrated in FIG. 15. The plot clearly indicates that substantially no change occurs in the molar mass distribution as a result of the thioacetalization. Polystyrene is used as a standard and indicates that M$_n$ is approximately 27,500 and M$_w$ is approximately 48,600. This molecular weight range is in agreement with the range previously determined for a PEEK sample of similar inherent viscosity using high temperature GPC of PEEK in phenol/trichlorobenzene as a solvent.

Example 16

PEEK Avecia Protected by 1,2-Ethanedithiol

In Example 16, a solution of PEEK Avecia protected by 1,2-ethanedithiol (FP4-34) is subjected to a de-protection reaction (Reaction 18) in order to recover the PEEK Avecia.

Reaction 18

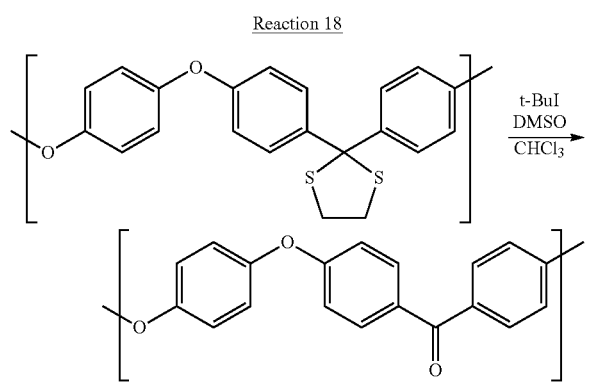

About 0.463 g (approximately 2.52 mmole) of 2-iodo-2-methylpropane and about 0.396 g (5.07 mmole) dimethylsulfoxide (DMSO) is added to a solution of PEEK Avecia protected by about 0.091 g 1,2-ethanedithiol in about 20 mL of chloroform ($CHCl_3$). After approximately 50 hours under reflux, the mixture is left to cool to about room temperature and poured into about 100 mL cold methanol. About 0.069 g of poly (ether ether ketone) is recovered on filtration as a grey powder, which represents a yield of about 96%.

The recovered PEEK is found to have approximately the following properties: $T_m$=341° C., $\eta_{inh}$, =0.82, $\delta_H$ (250 MHz, $CDCl_3$+TFA 6:1); 7.13 (4H, AA'XX'), 7.20 (4H, s), 7.84 (4H, AA'XX'); δC (62.5 MHz, $CDCl_3$+TFA 6:1) 117.4, 122.6, 130.4, 130.9, 133.9, 152.2, 163.5, 200.0.

These data demonstrate that the deprotected PEET compound recovered is substantially the same as the starting PEEK. Significantly, it may be noted that the inherent viscosity of the recovered material in sulfuric acid and that of the starting PEEK are substantially identical, 0.82. This result indicates that the solubilization of PAEKs through thioacetalization can be achieved without substantial chain degradation, thus providing a tool for analysis of these normally difficult to solubilize polymers by GPC.

Example 17

Conversion of Thioacetal PEEK to Acetal PEEK

In Example 17, a solution of Avecia PEEK protected with 1,3 propanedithiol was subjected to a protecting group exchange reaction with ethylene glycol (Reaction 19).

Reaction 19

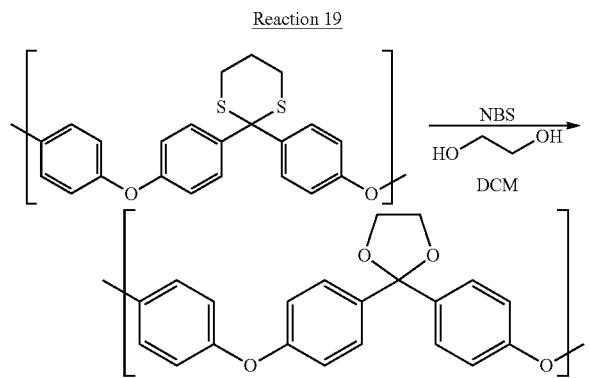

1.878 g (4.962 mmols) PEEK 1.3-dithiane was added to 150 ml DCM and vigorously stirred until all the solid had dissolved. A pink/light purple solution was formed.

To this solution was added 1.78 ml (29.77 mmols) of ethylene glycol (6 fold excess), added dropwise, followed immediately by 1.237 g (6.947 mmols) of NBS. The NBS (in the form of fine powder) was added very slowly (a few grains every 5-10 seconds) so complete addition is over 10-15 minutes. The solution turned a progressively darker lilac/purple on addition of the NBS. The solution was then stirred for a further 5-7 minutes, until all of the NBS was dissolved. The time was dependant on the final observable color change to an orange/brown/green color.

The solution was then poured into 450 ml of stirring methanol and the white precipitate was left to stir for 20 minutes before being filtered. The filtrate was then washed with another 400 ml methanol and left to stir for a further 20 minutes before being filtered and left overnight to air-dry. The yield was between 90-97% with conversion of thioacetal to acetal being between 60% and 93%. The remaining thioacetal groups had been converted back into ketone groups.

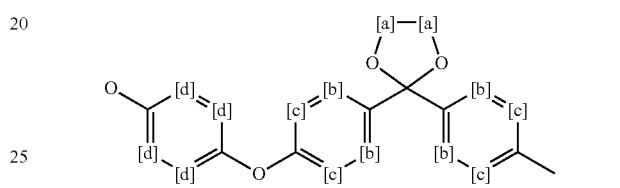

(Eclipse 500 MHz @ 25° C., $CDCl_3$) $\delta_H$ 4.06 (4H, s, Ha) 6.95 (4H, AA'XX', Hc), 7.05 (4H, s, Hd). 7.46 (4H, AA'XX', Hb).

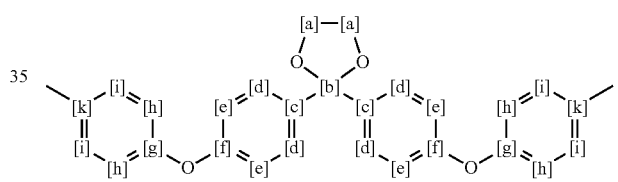

(Lambda 76.6 MHz @ 25° C., $CDCl_3$) $\delta_c$ 65 (Ca), 109.2 (Cb), 117 (Ce), 118 (Ch),
121.5 (Cd), 128.5 (Ci), 132.3 (Ck), 138 (Cc), 153 (Cf), 157 (Cg)

The acetal protected PEEK, having acetal protection levels of between 60 and 93% were found, in solvents such as THF and DCM, to have a soluble fraction of between 83 and 92% when made up using 5 weight percent solid. Samples of the acetal protected PEEK were dissolved up in THF solvent at 30 and 40% weight polymer and their viscosity was measured at room temperature over a range of frequencies. Both samples showed shear thinning behaviour and had viscosities at 1 Hz of 53500 and 1208000 cP respectively and viscosities of 14500 and 277000 cP at 10 Hz.

Thermogravimetric analysis for the ethylene glycol acetal protected PEEK was also collected, in both air and nitrogen. The samples in air started to lose mass at temperatures ranging from 270° C. to 326° C. and finished losing mass at around 430-440° C. Around this temperature the PEEK itself was degrading and so an accurate temperature for protecting group removal cannot be stated. The total weight lost in the deprotection, which also contained some elements of polymer degradation was around 11.17% for a 80% acetal protected PEEK with the theoretical deprotection weight loss being 10.6%. For an 89% acetal protected PEEK the weight loss was 17.14% with the theoretical deprotection weight loss being 11.8%. In nitrogen the final weight loss values were similar at 10.61% and 17.14% respectively but the onset of weight loss and final weight loss temperatures were increased to 308-347° C. for the onset temperature and 448-456° C. for the end of mass loss.

TGA MS on the acetal protected samples showed that the polymer was deprotecting as expected, losing an aldehyde from the acetal protected PEEK.

Example 18

Deprotection of an Acetal Protected Polymer by the Application of Water or Acidified Water Example 18 describes the deprotection of an ethylene glycol acetal protected PEEK by the reaction with water or acidified water (Reaction 20).

Reaction 20

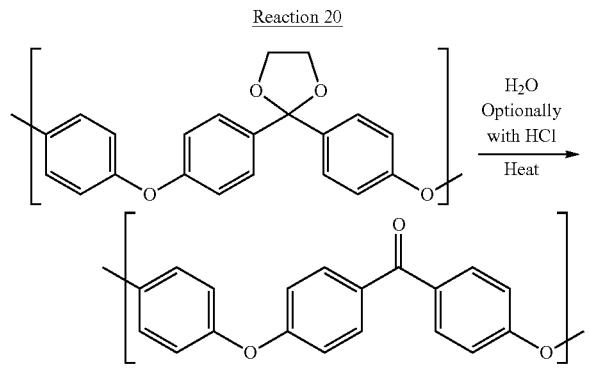

1 g (3.01 mmol) of ethylene glycol acetal protected PEEK was added to 5 ml of either water, water with 1% HCl or concentrated HCl. This was then heated in a microwave digestion apparatus to 160° C. for 15 minutes. After heating the solid was then filtered, washed with water, dried and then analysed by $^1$H NMR, $^{13}$C NMR, DSC, solution viscosity and GPC.

NMR on the deprotected samples suggested that microwave deprotection worked well. In 15 minutes at 160° C. the concentrated acid and 1% acid solutions both deprotected completely whilst the water only sample was ~87% deprotected. At lower temperatures of 110° C. in the acid containing samples the PEEK also looked to be completely deprotected.

All of the deprotected samples showed spectrum with the following signals. The sample deprotected with only water at 160° C. also showed a peak in the $^{13}$C NMR spectrum at ~64 ppm which may be indicative of a small amount of the —CH$_2$CH$_2$— functionality associated with the protecting group. A similar signal was not seen in the $^1$H NMR spectrum.

δc (75.6 MHz, CD$_2$Cl$_2$ +methansulfonic acid) 118, 123, 124, 139, 151.5, 168.5, 200.0.

DSC analysis is shown in the table below:—

| Deprotection method | Cooling | | | Heating | | |
| --- | --- | --- | --- | --- | --- | --- |
| | Onset of crystallinity (Degrees C.) | Peak (Degrees C.) | Normalised integral (J/g) | Onset of melt | Peak of melt | Normalised integral (J/g) |
| Water | 290 | 281 | 49 | 326 | 343 | 56 |
| 1% HCl | 296 | 287 | 53 | 329 | 343 | 59 |
| Conc. HCl | 292 | 279 | 51 | 319 | 339 | 48 |
| Unmodified PEEK | 304 | 294 | 53 | 331 | 344 | 63 |

The data shows no significant differences between the deprotected PEEK polymers and the unmodified polymer.

GPC analysis is shown in the table below:—

| Deprotection method | Mw | Mn | Mw/Mn |
| --- | --- | --- | --- |
| Water | 63462 | 24057 | 2.64 |
| 1% HCl | 64547 | 24905 | 2.59 |
| Conc. HCl | 62521 | 24495 | 2.55 |
| Unmodified PEEK | 62013 | 20698 | 3 |

The data suggests that some of the lower molecular weight polymers have been washed out during processing but does not suggest any significant degradation of the polymers after deprotection.

Inherent viscosity of the polymers in sulfuric acid is shown below.

| Deprotection method | Inherent viscosity (dL/g) |
| --- | --- |
| 1% HCl | 0.7 |
| Conc. HCl | 0.68 |
| Unmodified PEEK | 0.63 |

The data shows that the deprotected samples are not degraded after going through the protection deprotection cycle and are of a slightly higher viscosity than the original, unmodified PEEK.

Example 19

Deprotection of an Acetal Protected Polymer by the Application of Heat

In example 19 an acetal protected polymer was deprotected by heat alone (Reaction 21).

Reaction 21

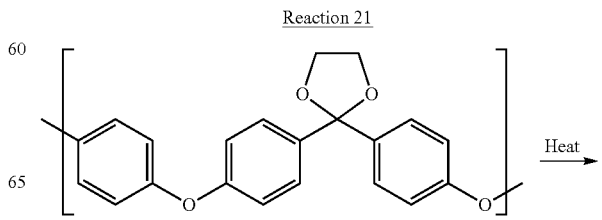

-continued

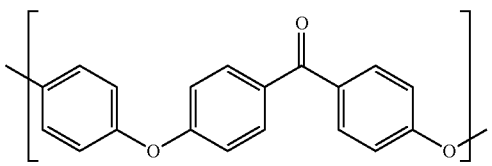

A small sample (~10 mg) of the acetal protected PEEK polymer was prepared for analysis by DSC. The sample was heated at 20° C./min from room temperature up to 420° C. It was then held at this temperature for 10 minutes before being cooled back to room temperature. The sample was then dissolved in methane sulfonic acid and dichloromethane and analysed by NMR spectroscopy.

The sample showed the peaks expected for standard PEEK polymer along with other soluble impurities but no evidence for residual acetal bridge. The sample also included some insoluble black material, expected to be degraded polymer.

Although the foregoing description has shown, described, and pointed out the fundamental novel features of the present teachings, it will be understood that various omissions, substitutions, and changes in the form of the detail of the apparatus as illustrated, as well as the uses thereof, may be made by those skilled in the art, without departing from the scope of the present teachings. Consequently, the scope of the present teachings should not be limited to the foregoing discussion, but should be defined by the appended claims.

The invention claimed is:

1. A method of forming a polymer matrix composite, comprising:
   mixing a starting poly (aryl ether ketone) (PAEK) polymer with a solvent and an acid, said solvent being selected from a group consisting of diethylether, tetrahydrofuran (THF), dioxin, and chlorinated solvents;
   reacting the PAEK mixture with a Lewis acid and a thiol compound in amounts effective to form a poly (aryl ether thioacetal) compound which comprises at least one thioacetal group;
   impregnating a plurality of fibers in the form of unidirectional fibers or woven fibers with a solution comprising said poly (aryl ether thioacetal) compound, and
   consolidating the impregnated fibers by applying heat and pressure,
   wherein the Lewis acid is boron trifluoride diethyl etherize (BF$_3$Et$_2$O), the thiol compound is 1,2 ethanedithiol or 1,3-propanedithiol, and the starting PAEK is selected from: poly (ether ketone) ("PEK"), poly (ether ether ketone) ("PEEK"), poly (ether ketone ketone) ("PEKK"), and poly (ether ketone ether ketone ketone) ("PEKEKK").

2. The method of claim 1, wherein the chlorinated solvent is selected from at least one of dichloromethane (DCM), trichloromethane (chloroform), dichloroethane, and dichlorobenzene.

3. The method of claim 1, wherein the acid being mixed with the starting PAEK is a non-sulfonating acid.

4. The method of claim 1, wherein the acid being mixed with the starting PAEK is trifluoroacetic acid.

5. The method of claim 1, wherein impregnating fibers comprises one of solution dipping and solution spray.

6. The method of claim 1, wherein the starting PAEK is PEEK and the poly (aryl ether thioacetal) compound comprises the following recurring unit (a) or (b):

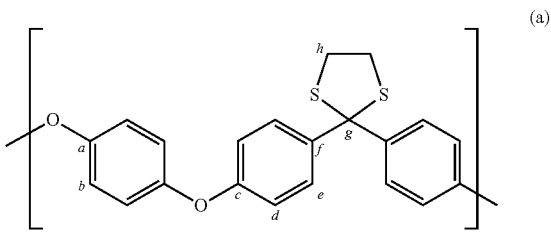

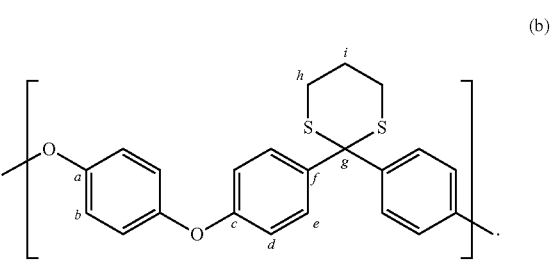

7. The method of claim 1, wherein the starting PAEK is PEK and the poly (aryl ether thioacetal) compound comprises the following recurring unit (c) or (d):

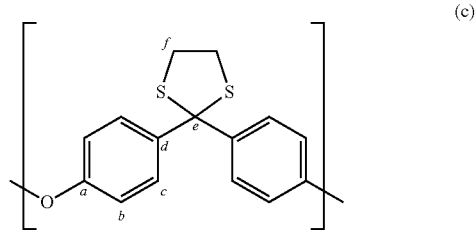

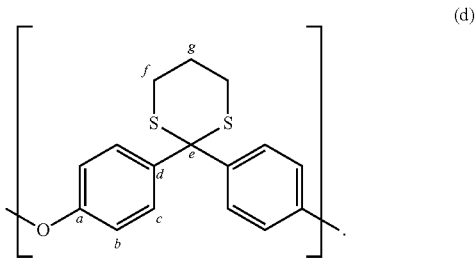

8. The method of claim 1, wherein the starting PAEK is PEKK, the thiol compound is 1,2-ethanedithiol, and the poly (aryl ether thioacetal) compound comprises the following recurring units (e) and (f):

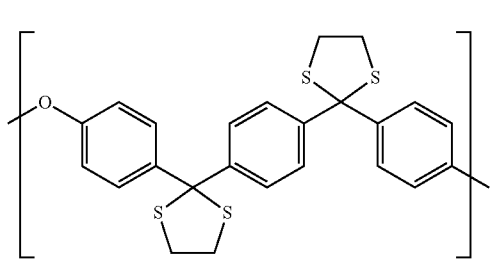
(e)

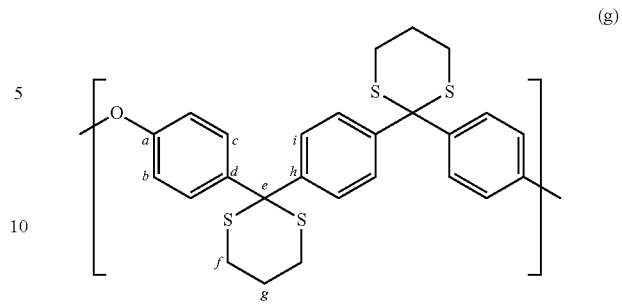
(g)

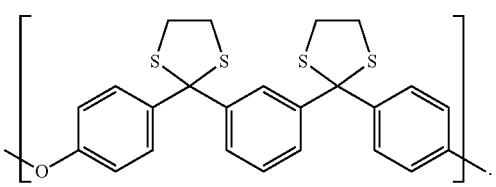
(f)

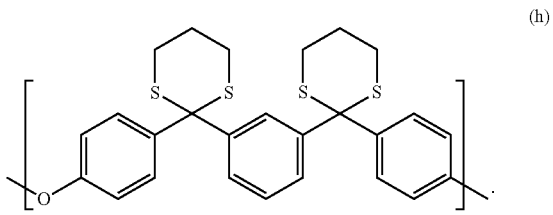
(h)

9. The method of claim 1, wherein the starting PAEK is PEKK, the thiol compound is 1,3-propanedithiol, and the poly (aryl ether thioacetal) compound comprises the following recurring units (g) and (h):

10. The method of claim 1, wherein the starting PAEK is PEKEKK, the thiol compound is 1,2-ethanedithiol, and the poly (aryl ether thioacetal) compound comprises the following recurring unit (i):

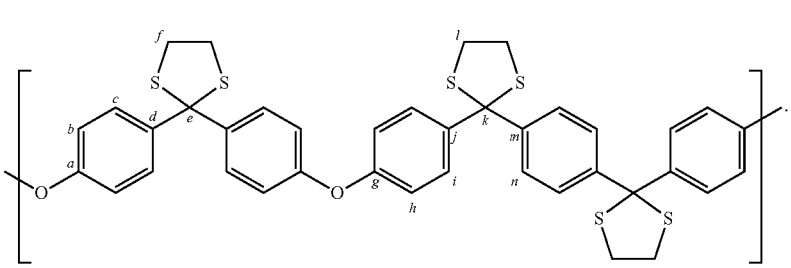
(i)

11. The method of claim 1, wherein the starting PAEK is PEKEKK, the thiol compound is 1,3-propanedithiol, and the poly (aryl ether thioacetal) compound comprises the following recurring unit (j):

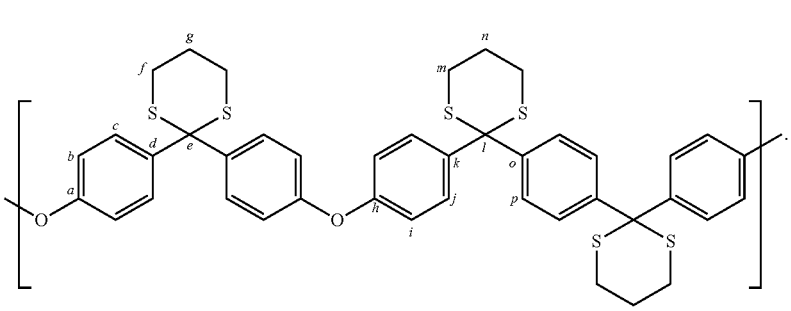
(j)

\* \* \* \* \*